US009589363B2

(12) United States Patent
Lawrence et al.

(10) Patent No.: US 9,589,363 B2
(45) Date of Patent: Mar. 7, 2017

(54) OBJECT TRACKING IN ENCODED VIDEO STREAMS

(71) Applicant: INTEL CORPORATION, Santa Clara, CA (US)

(72) Inventors: Sean J. Lawrence, Bangalore (IN); Ankita Tapaswi, Pune (IN)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 14/224,611

(22) Filed: Mar. 25, 2014

(65) Prior Publication Data

US 2015/0281715 A1    Oct. 1, 2015

(51) Int. Cl.
*H04N 7/12* (2006.01)
*G06T 7/20* (2006.01)

(52) U.S. Cl.
CPC .................. *G06T 7/2006* (2013.01)

(58) Field of Classification Search
CPC .. H04N 19/127; H04N 19/139; H04N 19/176; H04N 19/44
USPC .................................................. 375/240.16
See application file for complete search history.

(56) References Cited

U.S. PATENT DOCUMENTS

| | | | |
|---|---|---|---|
| 8,054,888 B2 * | 11/2011 | Seo ........................ | H04N 19/40 375/240.01 |
| 8,085,982 B1 | 12/2011 | Kim et al. | |
| 8,265,152 B2 * | 9/2012 | Anisimov ............ | H04N 19/593 348/403.1 |
| 8,422,555 B2 * | 4/2013 | Wang ................... | H04N 19/105 375/240.01 |
| 8,457,356 B2 | 6/2013 | Zheng | |
| 8,498,342 B1 * | 7/2013 | Sha ........................ | H04N 19/44 348/241 |
| 8,780,990 B2 * | 7/2014 | Fuchikami ........... | H04N 7/0127 348/154 |

(Continued)

OTHER PUBLICATIONS

Babu, et al., "Video Object Segmentation: A Compressed Domain Approach", IEEE Transactions on Circuits and Systems for Video Technology, vol. 14, No. 4, pp. 462-474 (Apr. 2004).

(Continued)

*Primary Examiner* — Shan Elahi
(74) *Attorney, Agent, or Firm* — Finch & Maloney PLLC

(57) ABSTRACT

Techniques are provided for tracking objects in an encoded video stream based on data directly extracted from the video stream, thus eliminating any need for the stream to be fully or partially decoded. Extracted motion vector and DC coefficient data can be used to provide a rough estimation of which macro-blocks are be associated with a background motion model and which macro-blocks correspond to a foreground object which is moving with respect to the background motion model. Macro-blocks which are associated with a moving foreground object can be grouped based on connectivity and a similarity measure derived from the extracted DC coefficient data. The grouped macro-blocks can be tracked from frame to frame to identify and eliminate groups having only negligible motion. The resulting validated macro-block groups will correspond to a rough object mask associated with a moving region in the analyzed frame.

25 Claims, 11 Drawing Sheets

(56) References Cited

U.S. PATENT DOCUMENTS

| | | | |
|---|---|---|---|
| 8,824,554 B2* | 9/2014 | Shi | H04N 19/52 375/240.01 |
| 2004/0037357 A1 | 2/2004 | Bagni et al. | |
| 2005/0078754 A1* | 4/2005 | Liang | H04N 19/00 375/240.18 |
| 2006/0098729 A1* | 5/2006 | Shen | G08B 13/19608 375/240.01 |
| 2007/0009028 A1 | 1/2007 | Lee et al. | |
| 2009/0110058 A1* | 4/2009 | Shen | G08B 13/19608 375/240.01 |
| 2010/0034254 A1* | 2/2010 | Wang | H04N 19/134 375/240.01 |
| 2010/0124274 A1* | 5/2010 | Cheok | H04N 19/176 375/240.03 |
| 2010/0246683 A1* | 9/2010 | Webb | H04N 19/895 375/240.16 |
| 2011/0249750 A1* | 10/2011 | Fuchikami | H04N 7/0127 375/240.16 |
| 2012/0027083 A1* | 2/2012 | Narroschke | H04N 19/70 375/240.03 |
| 2012/0063513 A1* | 3/2012 | Grange | H04N 19/61 375/240.13 |
| 2013/0188741 A1* | 7/2013 | Minoo | H04N 19/00903 375/240.26 |
| 2013/0230099 A1* | 9/2013 | DeForest | H04N 19/543 375/240.08 |
| 2015/0256850 A1* | 9/2015 | Kottke | H04N 19/56 375/240.16 |

OTHER PUBLICATIONS

Gang, et al., "Object Tracking Algorithm Based on Meanshift Algorithm Combining with Motion Vector Analysis", 2009 First International Workshop on Education Technology and Computer Science, pp. 987-990 (Mar. 2009).

Khatoonabadi, et al., "Video Object Tracking in the Compressed Domain Using Spatio-Temporal Markov Random Fields", IEEE Transactions on Image Processing, vol. 22, No. 1, pp. 30.

Porikli, et al., "Compressed Domain Video Object Segmentation", IEEE Transactions on Circuits and Systems for Video Technology, vol. 20, No. 1, pp. 2-14 (Jan. 2010).

* cited by examiner

FIG. 6

| background macro-block | background macro-block | background macro-block | background macro-block | background macro-block | background macro-block |
|---|---|---|---|---|---|
| background macro-block | 1st foreground macro-block $S_C$ $sm_1$ | background macro-block | background macro-block | background macro-block | background macro-block |
| background macro-block | background macro-block | background macro-block | background macro-block | background macro-block | background macro-block |
| background macro-block | background macro-block | 2nd foreground macro-block $sm_2$ $sv_2$ | 3rd foreground macro-block $sm_3$ $sv_3$ | 4th foreground macro-block $sm_4$ $sv_4$ | background macro-block |
| background macro-block | 5th foreground macro-block $sm_5$ $sv_5$ | 6th foreground macro-block $sm_6$ $sv_6$ | 7th foreground macro-block $S_B$ $sm_7$ $sv_7$ | 8th foreground macro-block $sm_8$ $sv_8$ | background macro-block |
| 9th foreground macro-block $sm_9$ $sv_9$ | 10th foreground macro-block $sm_{10}$ $sv_{10}$ | 11th foreground macro-block $sm_{11}$ $sv_{11}$ | 12th foreground macro-block $sm_{12}$ $sv_{12}$ | 13th foreground macro-block $sm_{13}$ $sv_{13}$ | background macro-block |
| 14th foreground macro-block $sm_{14}$ $sv_{14}$ | 15th foreground macro-block $S_A$ $sm_{15}$ $sv_{15}$ | 16th foreground macro-block $sm_{16}$ $sv_{16}$ | 17th foreground macro-block $sm_{17}$ $sv_{17}$ | background macro-block | background macro-block |
| 18th foreground macro-block $sm_{18}$ $sv_{18}$ | 19th foreground macro-block $sm_{19}$ $sv_{19}$ | 20th foreground macro-block $sm_{20}$ $sv_{20}$ | background macro-block | background macro-block | background macro-block |
| background macro-block | background macro-block | background macro-block | background macro-block | background macro-block | background macro-block |

1402

OBJECT TRACKING IN ENCODED VIDEO STREAMS

BACKGROUND

Digital video recording devices have become increasingly commonplace and can now be found in a broad range of consumer electronic devices, including cellular telephones, smartphones, digital cameras, and automobiles. Video recording devices also comprise a fundamental component of many surveillance and security systems, which due to their rapidly diminishing size have become ubiquitous in both public and private applications. It has also become routine for professional and amateur production artists to make their video content available through online media outlets. Complementing these trends, network infrastructure and computing devices have become increasingly capable of transmitting, processing, and displaying video content, including high definition video content. As a result, the amount of digital video content available to consumers has grown—and continues to grow—exponentially. Much of this content is stored and transmitted in a compressed format to reduce storage and bandwidth requirements. To leverage this massive amount of digital video content, a wide range of automated techniques for processing and analyzing such content have been developed. One class of such techniques relates to object tracking. In particular, object tracking techniques allow movement of a recorded object to be automatically detected and analyzed. Among other advantages, object tracking techniques enable computer systems to identify and follow moving objects in video content on an automated basis, thereby eliminating the need for active human viewing and/or monitoring in many applications.

DETAILED DESCRIPTION

Figure 1:
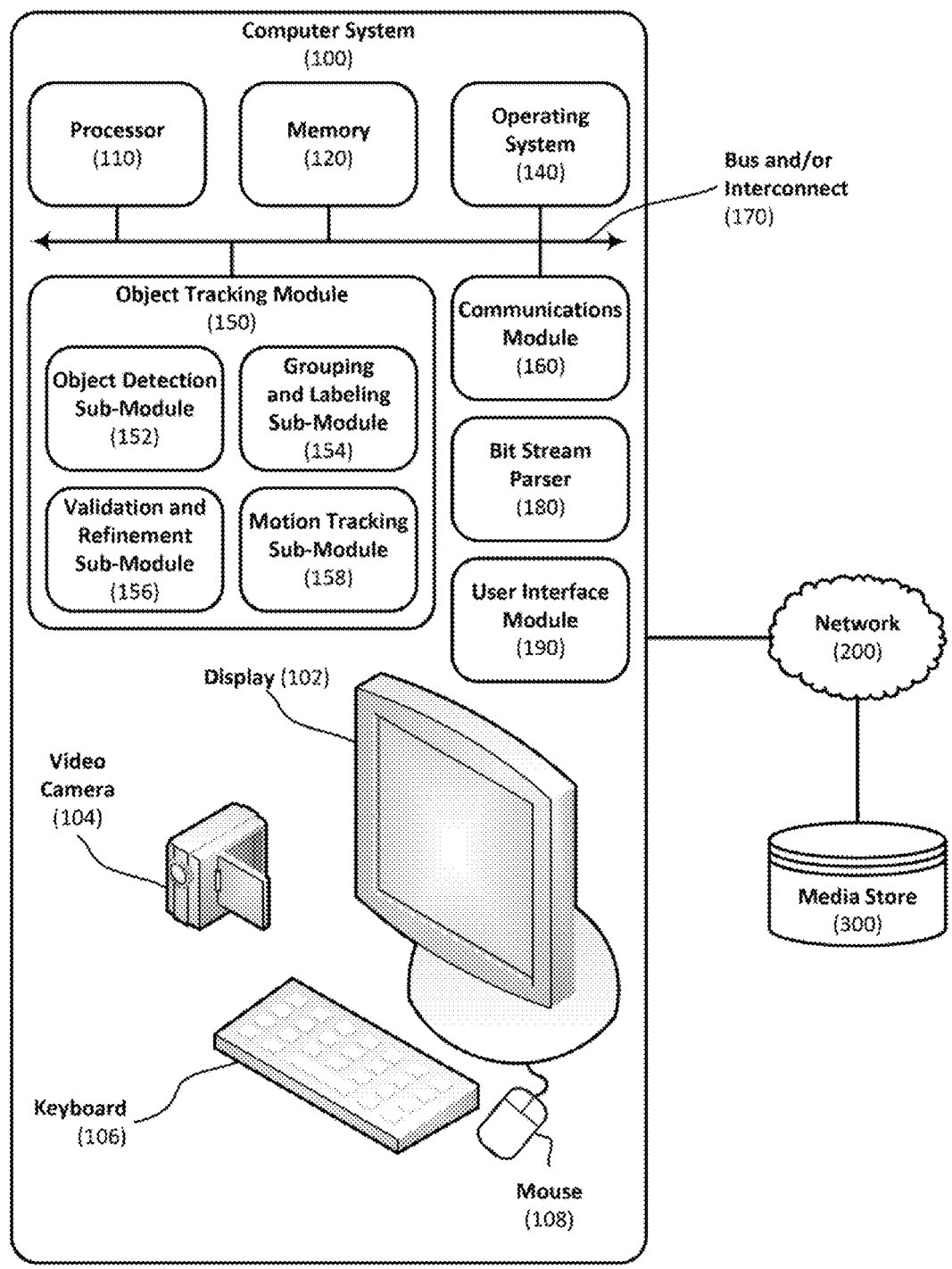
FIG. 1 is a block diagram schematically illustrating selected components of a computer system that can be used to track moving objects in an encoded video stream in accordance with certain embodiments.

Techniques are disclosed for tracking moving objects in an encoded video stream based on data directly extracted from the video stream, thus eliminating any need for the stream to be fully or even partially decoded. In one embodiment, an encoded video stream is parsed to extract motion vector data and DC coefficient data. The extracted motion vector data allows foreground object motion to be distinguished from a background motion model. The extracted DC coefficient data provides a low resolution grayscale image corresponding to the frame, thus providing a rough estimation of object shape. Using the extracted data, moving segments of a video frame can be identified and grouped together based on, for example, connectivity, similarity of appearance, and similarity of motion. Techniques are provided for validating the grouped segments and tracking their motion from frame to frame. This advantageously allows moving objects within the encoded video stream to be identified and tracked without ever actually decoding the video stream. Numerous configurations and variations of such techniques will be apparent in light of this disclosure.

General Overview

Video streams are often encoded according to a compression algorithm that enables the stream to be stored and transmitted using fewer storage and bandwidth resources. The Moving Picture Experts Group (MPEG) has defined a number of data compression standards that can be used to encode a video stream. For example, the H.262/MPEG-2 compression standard is widely used for transmission of digital television signals and for storage of movies and other programs that are distributed via digital versatile disk (DVD) or other similar disk. The H.264/MPEG-4 compression standard is widely used for Internet streaming applications, digital cinema applications, and the Blu-ray Disc format. A variety of other compression standards are used for other applications, including standards defined by organizations other than MPEG. In general, compression standards reduce both the amount of memory required to store digital video content as well as the network bandwidth required to transmit such content. Despite these advantages with respect to storage and transmission, use of compressed video encoding has complicated existing video analysis techniques since such techniques generally require an encoded video stream to be at least partially decoded before being analyzed. As a result, there is a demand for video analysis techniques, and in particular object tracking algorithms, that can be applied to an encoded video stream without requiring decoding of the stream.

Thus, and in accordance with certain of the embodiments disclosed herein, techniques are provided for tracking objects in an encoded video stream based on data directly extracted from the video stream, thus eliminating any need for the stream to be fully or partially decoded. Compression algorithms used for video encoding generally operate by defining a video stream in terms of a sequence of independent frames (I-frames) and intervening predicted frames (P-frames). An I-frame can be decoded independently of other frames, while P-frames can be understood as storing only differences as compared to an immediately preceding frame. These differences can be characterized in terms of motion vectors and coefficients referred to as DC coefficients. A motion vector represents the direction and distance that a particular area of an image moves between two adjacent frames. A DC coefficient represents a baseline pixel value (for example, corresponding to brightness or hue) for an n×n array of pixels referred to as a macro-block. Advantageously, motion vector and DC coefficient data can be extracted from an encoded video stream without decoding. More specifically, such data can be extracted by simply parsing data contained within the encoded stream, and therefore such extraction requires negligible processing capacity as compared to even partial decoding of the video stream.

The extracted motion vector and DC coefficient data can be used to provide a rough estimation of which macro-blocks are be associated with a background motion model and which macro-blocks correspond to a foreground object which is moving with respect to the background motion model. As used herein, it will be appreciated that the terms "foreground" and "background" refer not to a physical region of a video frame, but rather to a baseline motion model (background) and object movement that is distinguishable from that baseline (foreground) in terms of direction and/or magnitude. Macro-blocks which are associated with a moving foreground object can be grouped based on connectivity and a similarity measure derived from, among other things, the extracted DC coefficient data. Relying on motion vector data to detect moving objects may occasionally result in the detection of slight movements that result in non-zero motion vector values. Low-level motion such as this nevertheless does not correspond to perceptible movement of a group of macro-blocks from frame to frame. Thus the grouped macro-blocks can be tracked from frame to frame to identify and eliminate groups having only negligible motion. The resulting validated macro-block groups will correspond to a rough object mask associated with a moving region in the analyzed frame. This mask can be refined according to a user's preference and tracked from frame to frame.

The various methodologies disclosed herein advantageously allow moving objects within an encoded video stream to be identified and tracked without ever actually decoding the video stream, thereby significantly increasing the speed at which such analysis can be performed. Enabling video content searching and retrieval to be performed more rapidly is particularly useful in the context of video surveillance and security applications, real time video streaming applications, offline media applications, and other applications where object tracking techniques are used. Furthermore, because the methodologies disclosed herein rely on an initial analysis of motion vector data, the complexity of the image does not adversely impact the accuracy of the motion detection and tracking Use of motion vector data, which provides both motion direction and magnitude data, also advantageously allows different moving objects to be distinguished even when such objects are moving in the same direction.

System Architecture

FIG. 1 is a block diagram schematically illustrating selected components of a computer system 100 that can be used to track moving objects in an encoded video stream in accordance with certain embodiments. Computer system 100 may comprise, for example, one or more devices selected from a desktop or laptop computer, a workstation, a tablet, a smartphone, a set-top box or any other such computing device. A combination of different devices may be used in certain embodiments. In the illustrated embodiment, computer system 100 includes, among other things, a processor 110, a memory 120, an operating system 140, an object tracking module 150, and a communications module 160. As can be further seen, a bus and/or interconnect 170 is also provided to allow for intra-device communications using, for example, communications module 160. Computer system 100 is optionally coupled to a network 200 to allow for communications with other computing devices or resources, such as a networked media store 300. Other componentry and functionality not reflected in the schematic block diagram of FIG. 1 will be apparent in light of this disclosure, and it will be appreciated that other embodiments are not limited to any particular hardware configuration.

Processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disk drive, a universal serial bus (USB) drive, flash memory and/or random access memory (RAM). Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Communications module 160 can be any appropriate network chip or chipset which allows for wired and/or wireless connection to other components of computer system 100 and/or network 200, thereby enabling computer system 100 to communicate with other local and/or remote computing systems, servers, and/or resources.

Object tracking module 150 is configured to identify and track moving objects in an encoded video stream based on data directly extracted from the video stream, thus eliminating any need for the stream to be fully or partially decoded. It can be implemented or otherwise used in conjunction with a variety of suitable software and/or hardware that is coupled to or that otherwise forms a part of computer system 100. For example, in terms of software, in certain embodiments object tracking module 150 can be implemented or otherwise used in conjunction with a bit stream parser 180 that is capable of parsing and extracting data from a bit stream, such as a stream of compressed data that comprises an encoded video stream. Object tracking module 150 can additionally or alternatively be implemented or otherwise used in conjunction with a user interface module 190 that is capable of providing information to, and receiving information and commands from, a user. In terms of hardware, object tracking module 150 can be implemented or otherwise used in conjunction with input/output devices such as a display 102, a video camera 104, a textual input device such as a keyboard 106, and a pointer-based input device such as a mouse 108. Other input/output devices that may be used in other embodiments include a touchscreen, a touchpad, a speaker, and/or a microphone. Still other input/output devices can be used in other embodiments.

In certain embodiments object tracking module 150 is installed local to computer system 100, as shown in the example embodiment of FIG. 1. Alternatively, computer system 100 can be implemented in a client-server arrangement wherein at least some functionality associated with object tracking module 150 is provided to client computing system 100 using an applet, such as a JavaScript applet, or other downloadable module. Such a remotely accessible module or sub-module can be provisioned in real-time in response to a request from a client computing system for access to a given server having resources that are of interest to the user of the client computing system. For example, a user of a tablet computer may invoke functionality associated with object tracking module 150 upon accessing a networked media store 300 containing compressed video which is to be analyzed. In such embodiments the server can be local to network 200 or remotely coupled to network 200 by one or more other networks and/or communication channels. In some cases access to resources on a given network or computing system may require credentials such as usernames, passwords, and/or compliance with any other suitable security mechanism. In any such stand-alone or networked computing scenarios, object tracking module 150 may be implemented with any suitable technologies that allow a user to perform object tracking analysis on a compressed video stream.

Still referring to FIG. 1, in certain embodiments object tracking module 150 includes an object detection sub-module 152, a grouping and labeling sub-module 154, a validation and refinement sub-module 156, and a motion tracking sub-module 158. Object detection sub-module 152 can be used, for example, to provide a rough estimation of which macro-blocks are be associated with a background motion model and which macro-blocks correspond to a foreground object which is moving with respect to the background motion model. Such an estimation can be based on motion vector data extracted from the video stream. Grouping and labeling sub-module 154 can be used, for example, to group and label the macro-blocks estimated as being associated with a foreground object. Such grouping can be based on connectivity and a similarity measure that is derived from, among other things, the extracted DC coefficient data. Validation and refinement sub-module 156 can be used, for example, to (a) validate continued tracking of grouped macro-blocks from frame to frame to identify and eliminate groups having only negligible motion, and (b) refine an object mask by combining foreground macro-blocks which correspond to a single moving object. Motion tracking sub-module 158 can be used, for example, to reliably track moving objects which temporarily become static across frames. Thus the functionality provided by the various sub-modules comprising object tracking module 150 enable moving objects to be tracked in an encoded video stream based on data extracted from the video stream without actually decoding the stream. Additional details regarding the operation of these modules are provided in the "Methodology" subsection below.

The various embodiments disclosed herein can be implemented in various forms of hardware, software, firmware, and/or special purpose processors. For example in one embodiment a non-transitory computer readable medium has instructions encoded thereon that, when executed by one or more processors, cause one or more of the object tracking methodologies disclosed herein to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments object tracking module 150 provides object tracking services by leveraging processing resources provided by a remote computer system accessible via network 200. In other embodiments the functionalities disclosed herein can be incorporated into other software applications, such as video editing applications, video analysis applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments computer system 100 may comprise additional, fewer, or alternative subcomponents as compared to those included in the example embodiment of FIG. 1.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Methodology

Figure 2:
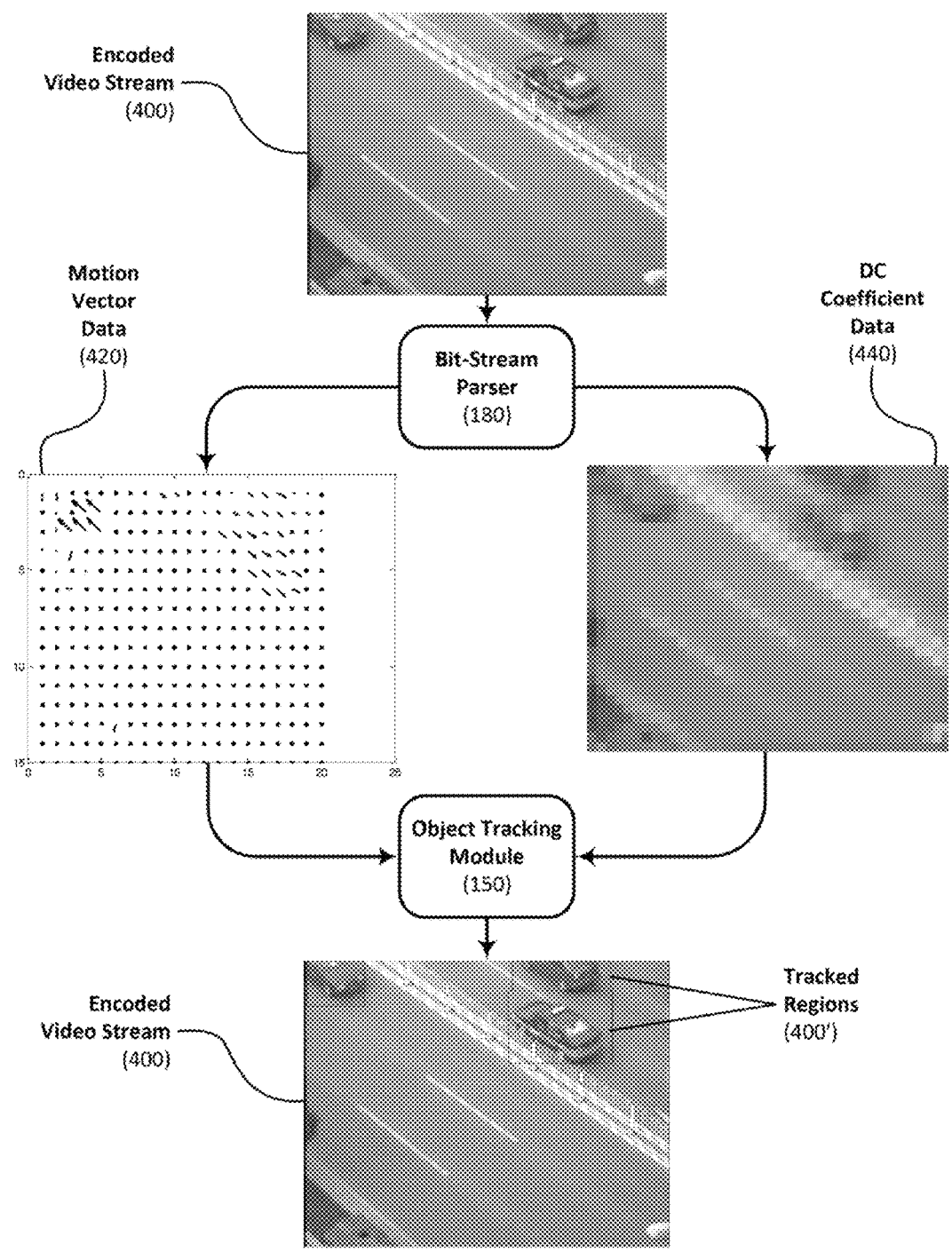
FIG. 2 is a data flow diagram schematically illustrating a technique for tracking moving objects in a selected frame of an encoded video stream in accordance with certain embodiments.
Figure 3:
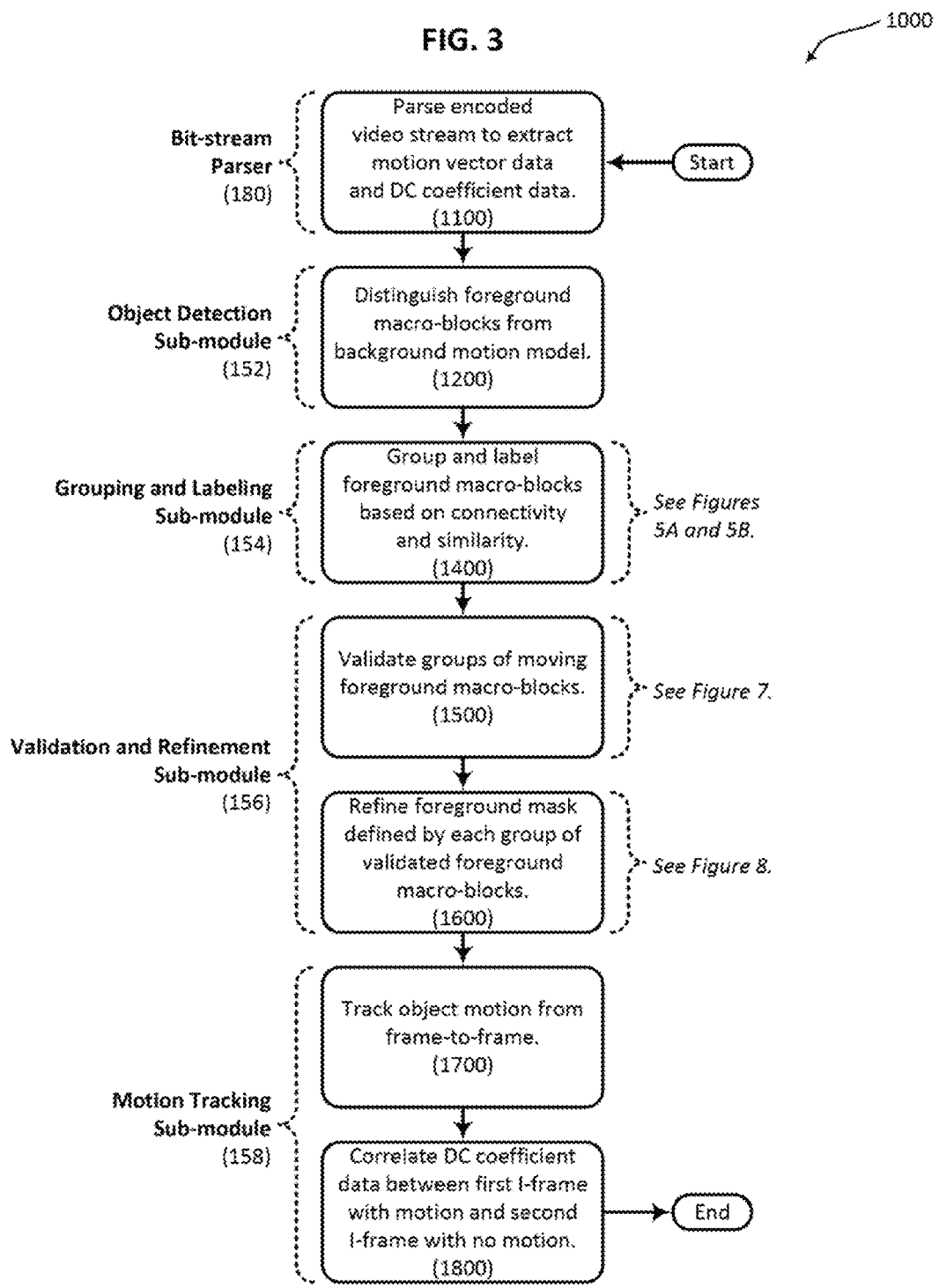
FIG. 3 is a flowchart illustrating an example technique for tracking moving objects in an encoded video stream in accordance with certain embodiments.

FIG. 2 is a data flow diagram schematically illustrating a technique for tracking moving objects in a selected frame of an encoded video stream. FIG. 3 is a flowchart illustrating an example method 1000 for tracking moving objects in an encoded video stream. As can be seen, example method 1000 includes a number of phases and sub-processes, the sequence of which may vary form one embodiment to another. However, when considered in the aggregate, these phases and sub-processes form a complete object tracking process that can be made responsive to user commands in accordance with certain of the embodiments disclosed herein. These embodiments can be implemented, for example using the system architecture illustrated in FIG. 1, as described above. However other system architectures can be used in other embodiments, as will be apparent in light of this disclosure. To this end, the correlation of the various functions shown in FIGS. 2 and 3 to the specific components illustrated in FIG. 1 is not intended to imply any structural and/or use limitations. Rather other embodiments may include, for example, varying degrees of integration wherein multiple functionalities are effectively performed by one system. For example, in an alternative embodiment a single module can be used to label and validate macro-block groups associated with moving objects in a video frame. Thus other embodiments may have fewer or more modules and/or sub-modules depending on the granularity of implementation. Numerous variations and alternative configurations will be apparent in light of this disclosure.

As illustrated in FIGS. 2 and 3, in one embodiment object tracking method 1000 commences with using bit-stream parser 180 to parse an encoded video stream 400 to extract motion vector data 420 and DC coefficient data 440. See reference numeral 1100 in FIG. 3. Such data can be extracted without decoding video stream 400. As used herein, "decoding" refers to an operation that involves performing calculations or other computational operations on the data comprising an encoded stream. Decoding should be distinguished from "parsing" or "extracting" data from the encoded stream, which involves only reading the data comprising the encoded stream. It will be appreciated that extracting data from an encoded stream requires negligible computing resources since data extraction amounts to little more than copying data from the stream to memory. In contrast, it will be appreciated that decoding an encoded stream will generally require significant computing resources due to the requisite calculations. In certain embodiments, motion vector data 420 and DC coefficient data 440 can be extracted from encoded stream 400 by parsing as opposed to decoding. For example, extracting motion vector data 420 and DC coefficient data 440 can be accomplished without reconstructing frames of video stream 400 by applying incremental changes described in a P-frame to baseline data provided in an I-frame. Because even partial decoding is computationally demanding, avoiding such decoding allows the methods disclosed herein to be performed significantly faster than methods that require some degree of decoding.

Motion vector data 420 represents the direction and distance that a particular image segment appears to move between two adjacent frames. For example, with respect to the selected frame of encoded video stream 400 illustrated in FIG. 2, corresponding motion vector data 420 illustrates both a direction and magnitude associated with images appearing in each of the macro-blocks that comprise the illustrated frame. More generally, motion vector data 420 can be understood as illustrating which portions of the frame are associated with motion (for example, the cars) and the relative direction and magnitude of this motion (for example, the car on the left is moving faster than, and in an opposite direction with respect to the two cars on the right). DC coefficient data 440 represents a baseline pixel value for each macro-block. The pixel value may correspond to an appearance characteristic such as brightness, luminosity, or hue. For example, with respect to the selected frame of encoded video stream 400 illustrated in FIG. 2, corresponding DC coefficient data 440 illustrates a grayscale value corresponding to each macro-block. More generally, DC coefficient data 440 can be understood as providing a low-resolution grayscale image in which the generalized shapes of objects can be discerned.

Method 1000 further comprises using object tracking module 150 to identify one or more tracked regions 400' within a given frame of encoded video stream 400. To this end, object detection sub-module 152 can be used to distinguish foreground macro-blocks from a background motion model in a given frame. See reference numeral 1200 in FIG. 3. A histogram-based approach can be used in this regard. In particular, counting the number of motion vectors having a given motion characteristic in the x- and y-dimensions will usually result in a large quantity of motion vectors having a motion characteristic that corresponds to background motion, if any. For example, in a video where an automobile is moving across a stationary background scene, the largest quantity of tallied motion vectors will correspond to a null vector (that is, no motion). Any moving objects in the frame, such as the automobile, will each correspond to a small quantity of motion vectors having a non-zero motion characteristic in the x- and/or y-dimensions. In general, building a histogram of motion vectors in the x- and y-dimensions will usually result in a peak in each dimension. This peak can be understood as corresponding to a background motion model.

It will be appreciated that the background motion model does not necessarily correspond to zero-motion, but rather a baseline motion that defines the largest portion of a given frame. Thus, for example, in a video where a spider is recorded walking across the window of a moving train, as recorded from inside the train, the background motion model will correspond to the relatively uniform motion of the scenery passing by the train. This is because this relatively uniform motion will constitute the largest portion of a given frame. The distinctive motion of the spider will correspond to foreground macro-blocks that are associated with motion vectors which are distinguishable from the background motion model. Thus, as used herein, terms "foreground" and "background" refer not to a physical region of a video frame, but rather to a baseline motion (background) and object movement that is distinguishable from that baseline in terms of direction and/or magnitude (foreground).

Figure 4:
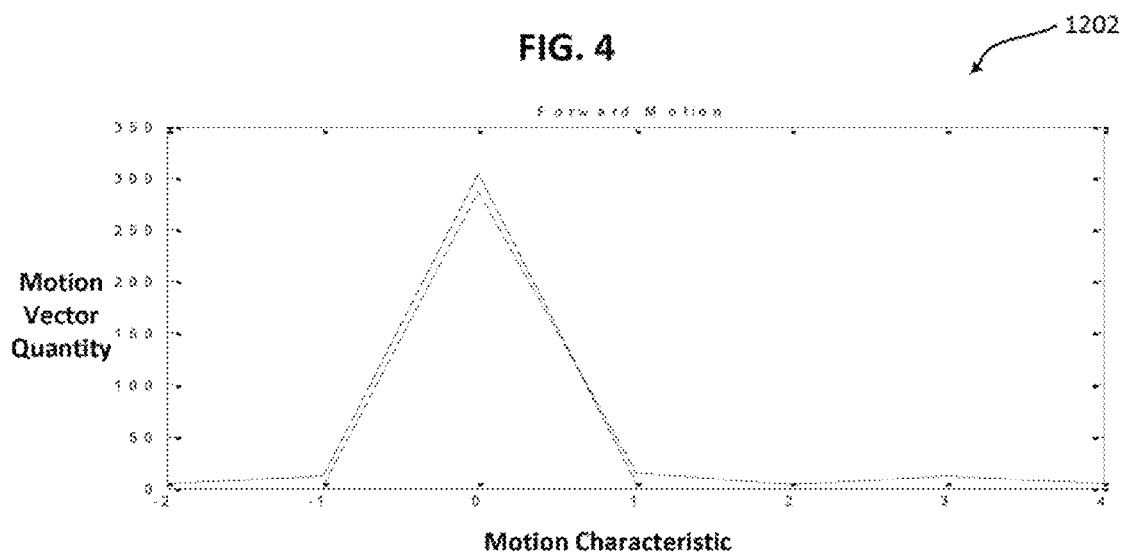
FIG. 4 is a histogram illustrating a quantity of motion vectors as a function of a motion characteristic for an example video frame showing a single person walking across a stationary background scene.

Distinguishing foreground macro-blocks from a background motion model in a given frame using the techniques disclosed herein may be referred to as a histogram-based approach. This is because generating a histogram that counts the number of motion vectors associated with a given motion characteristic will usually result in a distinctive peak that corresponds to the background motion model. For example, FIG. 4 illustrates a histogram 1202 indicating a quantity of motion vectors as a function of a motion characteristic for an example video frame illustrating a person walking across a stationary background scene. The large quantity of zero-value motion vectors corresponds to the stationary background scene, while the small number of positive- and negative-value motion vectors corresponds to the various parts (arms, legs, torso, head) of the person. Histogram 1202 can be used to quickly classify each motion vector as being associated with a background motion model (the zero-value vectors in this example) or with a foreground motion that is distinguishable from the background (the non-zero-value vectors in this example). It will be appreciated that such analysis and classification may be performed by simply tallying the vector quantities without actually generating a graphical image corresponding to histogram 1202.

Figure 5:
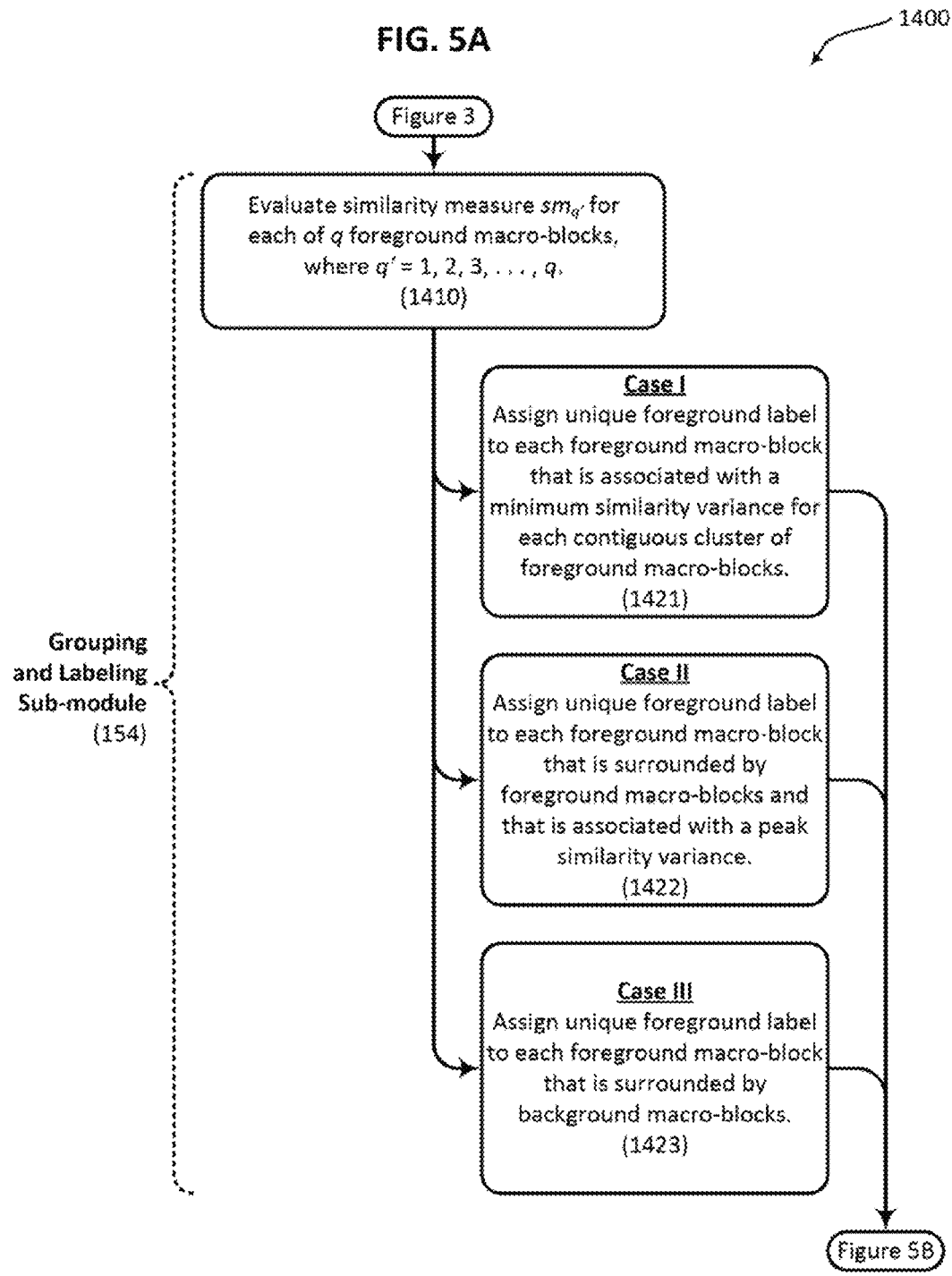
FIGS. 5A and 5B comprise a flowchart illustrating an example technique for grouping and labeling foreground macro-blocks which have motion that is distinguishable from a background motion model in accordance with certain embodiments.

In general, for each frame having detected foreground motion, object detection sub-module 152 will produce one or more contiguous clusters of macro-blocks identified as having foreground motion that is distinguishable from the background motion model. However, a single contiguous cluster of foreground macro-blocks may be associated with multiple moving objects in the analyzed frame, such as when separate moving objects overlap, abut, or are otherwise spatially contiguous with each other. Thus in certain embodiments, method 1000 further comprises using grouping and labeling sub-module 154 to group and label foreground macro-blocks based on connectivity and similarity. See reference numeral 1400 in FIG. 3. In particular, FIGS. 5A and 5B comprise a flowchart illustrating an example method 1400 for grouping and labeling foreground macro-blocks which have motion that is distinguishable from a background motion model. In one embodiment method 1400 commences with evaluating a similarity measure $sm_{q'}$ for each of the q macro-blocks which were previously identified as corresponding to foreground motion. See reference numeral 1410 in FIG. 5A. Here q is the total quantity of foreground macro-blocks in the analyzed frame which were previously identified as having distinguishable motion with respect to the background motion model, and q'=1, 2, 3, . . . , q.

The similarity measure $sm_{q'}$ of the q'th macro-block may be based on one or more of the location of the q'th macro-block in the frame, the gray level variance of the q'th macro-block (as determined by a corresponding DC coefficient value), and the motion of the q'th macro-block (as determined by a corresponding motion vector). Such factors, which are useful in distinguishing different moving objects from each other, can advantageously be extracted from encoded video stream 400 without performing decoding operations, as described herein. In modified embodiments fewer, additional, or alternative factors can be used to evaluate similarity measure $sm_{q'}$. Once similarity measure $sm_{q'}$ is evaluated for each of the q macro-blocks, a unique foreground label can be assigned to selected foreground macro-blocks based on one or more additional criteria. These uniquely labeled foreground macro-blocks can act as seed points for the labeling of the remaining foreground macro-blocks in the frame. Each uniquely-labeled foreground macro-block may be understood as corresponding to a unique foreground object identified as having distinguishable motion with respect to the background motion model. For example, in a video where two automobiles are moving across a stationary background scene, each automobile may be associated with a group of macro-blocks which share a common label amongst that group, such as label "A" for the macro-blocks comprising Car A and label "B" for the macro-blocks comprising Car B. The unique foreground labels can be assigned to particular foreground macro-blocks based on a variety of criteria.

One such criterion, referred to herein as "Case I", corresponds to a situation where a plurality of foreground macro-blocks are connected in a contiguous cluster. An example of this can be illustrated with reference to FIG. 6, which schematically illustrates a 6×9 array 1402 of 54 macro-blocks that can be understood as forming a portion of an example video frame. Some of the macro-blocks are associated with a background motion model, while some of the macro-blocks correspond to foreground motion that is distinguishable from the background motion model. The 1st foreground macro-block is surrounded by background macro-blocks, while the 2nd through 20th foreground macro-blocks form a contiguous cluster of macro-blocks. Each foreground macro-block in the cluster can be understood has having both a similarity measure $sm_{q'}$, as previously described, as well as a similarity variance $sv_{q'}$. The similarity variance $sv_{q'}$ of the q'th foreground macro-block corresponds to a variance of $sm_{q'}$ and the similarity measures of all of the foreground macro-blocks which are vertically, horizontally, or diagonally adjacent to the q'th macro-block. For example, with respect to the 10th foreground macro-block illustrated in FIG. 6, the similarity variance $sv_{10}$=var($sm_5$, $sm_6$, $sm_9$, $sm_{10}$, $sm_{11}$, $sm_{14}$, $sm_{15}$, $sm_{16}$) because the 10th foreground macro-block is vertically, horizontally, or diagonally adjacent to the 5th, 6th, 9th, 11th, 14th, 15th, and 16th foreground macro-blocks.

Figure 6:
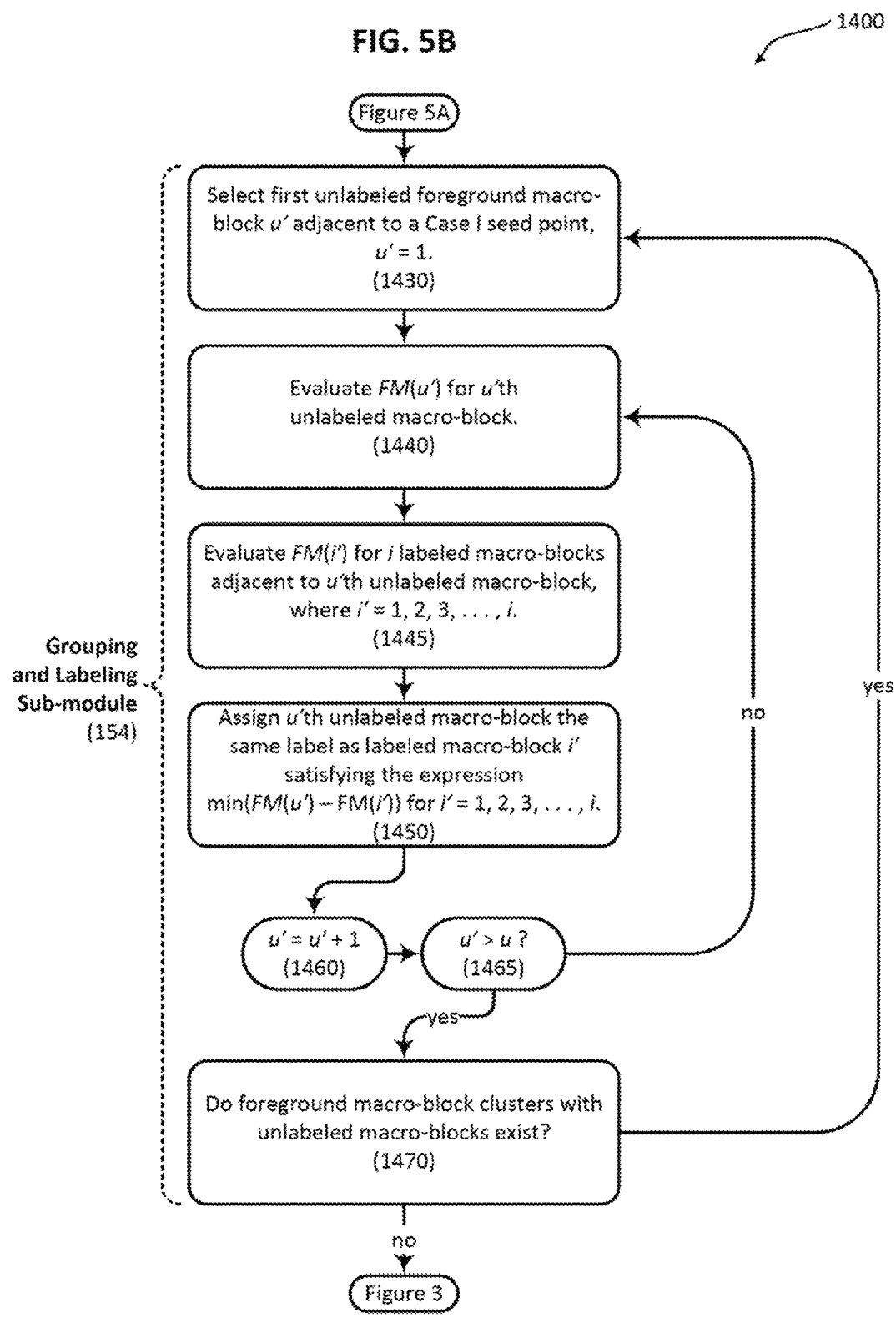
FIG. 6 schematically illustrates a 6×9 array of 54 macro-blocks that can be understood as forming a portion of an example video frame; some of the macro-blocks are associated with a background motion model, while some of the macro-blocks are associated with foreground motion that is distinguishable from the background motion model.

Referring still to FIG. 6, because the 2nd through 20th foreground macro-blocks form a contiguous cluster of macro-blocks, these macro-blocks can be understood as corresponding to at least one foreground object having motion that is distinguishable from the background motion model. Among the macro-blocks within this cluster, the macro-block having the lowest similarity variance can be considered to be most likely to fall within a region corresponding to the foreground movement. In particular, a macro-block having a low similarity variance with respect to its neighbors suggests similarity in appearance and motion with respect to neighboring macro-blocks. Thus, the macro-block having the minimum similarity variance amongst $sv_2$ through $sv_{20}$ can be assigned a unique foreground label which will serve as a seed point for subsequent labeling of adjacent macro-blocks. For example, if min($sv_2$, . . . , $sv_{20}$)=$sv_{15}$, then the 15th foreground macro-block would be assigned a unique foreground label. In particular, the 15th foreground macro-block can be assumed to safely lie in the heart of the object and a corresponding macro-block cluster can by understood as originating from this seed point. In FIG. 6 the 15th foreground macro-block has been labeled $S_A$, thus indicating that it is a seed point with the unique foreground label "A" in this example. More generally, unique foreground labels can be assigned to each foreground macro-block associated with a minimum similarity variance for a given contiguous cluster of foreground macro-blocks. See reference numeral 1421 in FIG. 5A. Thus where a given frame comprises m separate contiguous clusters of foreground macro-blocks, a corresponding m unique foreground labels will be assigned to particular macro-blocks within the frame pursuant to Case I.

Another criterion for assigning a unique foreground label to a particular foreground macro-block is referred to herein as "Case II". Case II corresponds to a situation where multiple moving objects intersect, overlap, abut, or otherwise join in a way that causes their corresponding macro-blocks to form a single contiguous cluster. In this case, because the resulting cluster corresponds to motion of multiple objects, multiple unique foreground labels should be associated with the cluster. One such unique foreground label will be assigned based on a minimum similarity variance in accordance with Case I. Additional unique foreground labels can be assigned by identifying peak similarity variance values that correspond to a boundary region where multiple objects intersect, overlap, abut, or are otherwise positioned adjacent to each other. Because similarity variance values are expected to be higher around the boundary of an object, and therefore around the boundary of the corresponding macro-block cluster, for purposes of this Case II, only peak similarity variance values for foreground macro-blocks which are surrounded by other foreground macro-blocks—that is, macro-blocks internal to the cluster—are considered. Peak similarity variance values within the macro-block cluster can be understood as corresponding to boundary regions where two moving objects adjoin each other. Variance in such regions will be at a peak due to differences in appearance and motion of the two different moving objects.

For example, referring again to array 1402 illustrated in FIG. 6, the 7th, 11th, and 15th foreground macro-blocks are each surrounded by other foreground macro-blocks. As described above in connection with Case I, if min($sv_2$, . . . , $sv_{20}$)=$sv_{15}$, then the 15th foreground macro-block will be assigned a first unique foreground label $S_A$. If $sv_7$ and $sv_{11}$ are less than or similar to neighboring similarity variance values, then the 7th and 11th foreground macro-blocks will not be assigned a second unique foreground label pursuant to Case II. However, if $sv_7$ and/or $sv_{11}$ correspond to peak similarity variance values as compared to other neighboring similarity variance values, then any peak values would be assigned a unique foreground label in accordance with Case II. For example, if max($sv_2$, $sv_3$, $sv_4$, $sv_6$, $sv_7$, $sv_8$, $sv_{11}$, $sv_{12}$, $sv_{13}$)=$sv_7$, then the 7th foreground macro-block will be assigned a second unique foreground label. In FIG. 6 the 7th foreground macro-block has been labeled $S_B$, thus indicating that it is a seed point with the unique foreground label "B" in this example. More generally, unique foreground labels can also be assigned to each foreground macro-block that is (a) surrounded by other foreground macro-blocks, and (b) associated with a peak similarity variance value. See reference numeral 1422 in FIG. 5A. However, where a macro-block cluster corresponds to a single moving object, no such peak similarity variance values may be identified, in which case no unique foreground labels will be assigned in accordance with Case II.

Yet another criterion for assigning a unique foreground label to a particular foreground macro-block will be referred herein to as "Case III". Case III corresponds to a situation where a single foreground macro-block is surrounded by macro-blocks associated with the background motion model. For example, referring again to array 1402 illustrated in FIG. 6, the 1st foreground macro-block is surrounded by background macro-blocks. Because 1st foreground macro-block is not connected to any other foreground macro-blocks, it can be assumed that any foreground motion associated with the 1st foreground macro-block is separate from motion of other foreground objects appearing in the frame. Thus the 1st foreground macro-block can be assigned a foreground label that is unique with respect to other foreground labels. In FIG. 6 the 1st foreground macro-block has been labeled $S_C$, thus indicating that it is a seed point with the unique foreground label "C" in this example. More generally, unique foreground labels can also be assigned to each foreground macro-block that is surrounded by macro-blocks associated with the background motion model. See reference numeral 1423 in FIG. 5A.

Thus, for video frames that contain movement as defined by motion vector data 420, k unique foreground labels will be assigned to k macro-block seed points according to the various criteria set forth herein, k≥1. If a given frame includes at least one moving foreground object, Case I will result in the assignment of at least one unique foreground label, while Cases II and III may or may not result in the assignment of any additional unique foreground labels. It will be appreciated that although these criteria are described herein with the labels Case I, Case II, and Case III (and with corresponding reference numerals 1421, 1422, and 1423 in FIG. 5A), the various methodologies corresponding to these cases need not be performed in any particular order. Moreover, in other embodiments fewer, additional, or alternative criteria for assigning unique foreground labels can be used.

Where q macro-blocks are identified as having distinguishable motion with respect to a background motion model, and k unique foreground labels are assigned to a corresponding k macro-blocks based on the criteria described herein, the quantity u=q−k can be understood as corresponding to the number of remaining unlabeled foreground macro-blocks. Labeling of the remaining u unlabeled foreground macro-blocks can commence by selecting a first unlabeled foreground macro-block adjacent to a seed point identified pursuant to Case I. See reference numeral 1430 in FIG. 5B. This first unlabeled foreground macro-block will be adjacent to at least one labeled macro-block—the seed point assigned according to Case I. However, the first unlabeled foreground macro-block may also be adjacent to one or more other labeled macro-blocks, such as seed points assigned according to Case II. In general, a u'th unlabeled foreground macro-block can be understood as being adjacent to i labeled macro-blocks, where u'=1, 2, 3, . . . , u and where 1≤i≤8.

A u'th unlabeled foreground macro-block can be labeled by comparing a feature map FM(u') of the u'th unlabeled foreground macro-block with feature maps FM(i') of the i adjacent labeled macro-blocks, i'=1, 2, 3, . . . , i. In general, a feature map FM(a) of macro-block a can be defined as FM(a)={$x_a$; $y_a$; $v_a$; $sv_a$}, where $x_a$ and $y_a$ correspond to the x- and y-coordinates of macro-block a, respectively, $v_a$ corresponds to the motion vector data 420 associated with macro-block a, and $sv_a$ corresponds to the similarity variance associated with the ath macro-block. Thus FM(u') can be evaluated for the u'th unlabeled foreground macro-block. See reference numeral 1440 in FIG. 5B. Likewise, FM(i') can be evaluated for all i labeled macro-blocks which are adjacent to the u'th unlabeled foreground macro-block. See reference numeral 1445 in FIG. 5B. The u'th unlabeled foreground macro-block can then be assigned the same label as the labeled macro-block i' satisfying the expression min(FM(u')−FM(i')) for i'=1, 2, 3, . . . , i. See reference numeral 1450 in FIG. 5B. Thus where the u'th unlabeled foreground macro-block is adjacent to a single labeled macro-block, the u'th macro-block will be assigned the same label as the adjacent labeled macro-block. However, where the u'th unlabeled foreground macro-block is adjacent to a plurality of labeled macro-blocks i that are not labeled uniformly, the u'th macro-block will be assigned a label based on the most similar neighboring labeled macro-block, wherein similarity is measured by the similarity variance parameter sv.

Once the u'th macro-block is labeled, the counter u' can be incremented. See reference numeral 1460 in FIG. 5B. This can be accomplished by selecting a subsequent unlabeled macro-block for labeling. In certain embodiments the subsequent unlabeled macro-block is selected based on an identification of an unlabeled macro-block that is adjacent to a maximum number of labeled macro-blocks. In other embodiments the subsequent unlabeled macro-block is selected by sequentially selecting macro-blocks surrounding the seed point, such as the Case I seed point, in a circular clockwise or counter-clockwise fashion. In still other embodiments the subsequent unlabeled macro-block is selected by sequentially selecting macro-blocks in a linear fashion. If all u' macro-blocks are labeled and there are no more unlabeled macro-blocks to select (that is, if u'>u after incrementing u') (see reference numeral 1465 in FIG. 5B), it can be determined whether there exist additional clusters of foreground macro-blocks having unlabeled macro-blocks. See reference numeral 1470 in FIG. 5B. If such unlabeled foreground macro-blocks exist, the foregoing macro-block labeling technique can be repeated.

Figure 7:
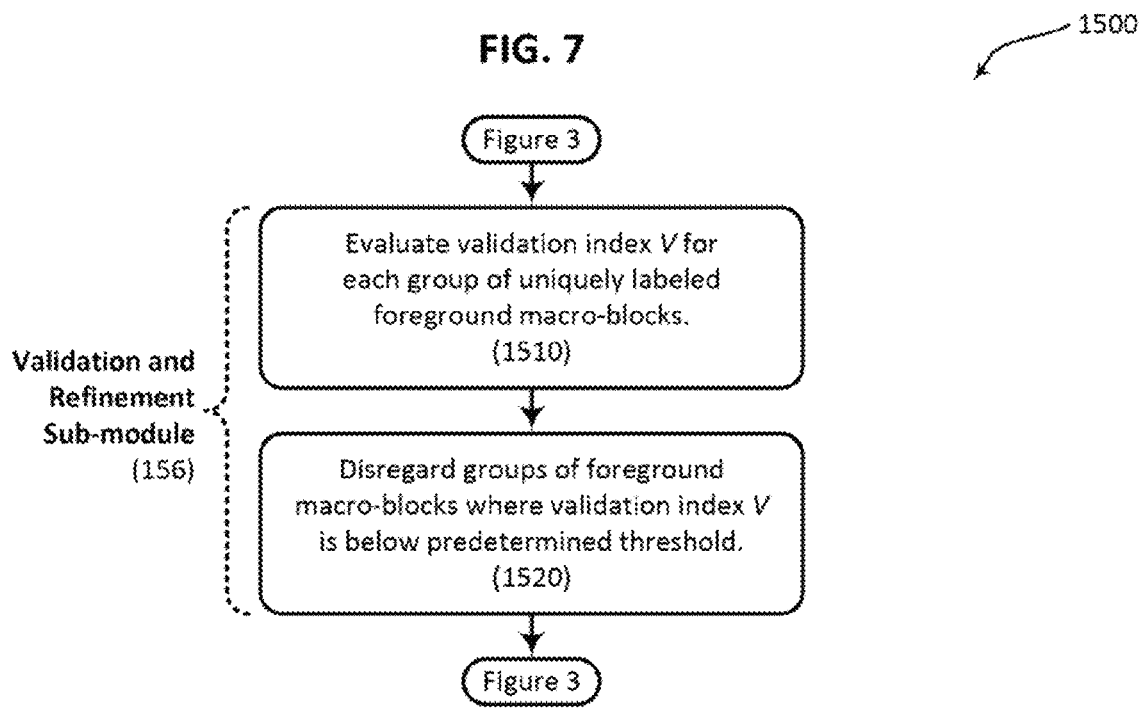
FIG. 7 is a flowchart illustrating an example technique for validating groups of moving foreground macro-blocks in accordance with certain embodiments.

Referring again to FIG. 3, once all foreground macro-blocks have been grouped and labeled, the analyzed frame will contain one or more groups of foreground macro-blocks, each group being identified by a unique label. For example, a frame comprising three moving cars will be associated with three groups of foreground macro-blocks, each group having a unique label. Validation and refinement sub-module 156 can be used to validate the groups of moving foreground macro-blocks. See reference numeral 1500 in FIG. 3. In particular, relying on motion vector data to detect moving objects may occasionally result in the detection of slight movements that result in non-zero motion vector values. Low-level motion such as this nevertheless does not correspond to perceptible movement of a group of macro-blocks from frame to frame. Thus validation and refinement sub-module 156 can be used to track the groups of moving foreground macro-blocks from frame to frame to identify and eliminate macro-block groups having only negligible motion. FIG. 7 is a flowchart illustrating an example method 1500 for validating groups of moving foreground macro-blocks in accordance with certain embodiments.

In one embodiment method 1500 commences with evaluating a validation index V for a given group of uniquely labeled foreground macro-blocks. See reference numeral 1510 in FIG. 7. The validation index V can be defined by $$V = \frac{A\bar{v}}{s}, \quad (1)$$

where A corresponds to an area of the macro-block group, $\bar{v}$ corresponds to a mean frame-to-frame motion of the macro-block group, and s corresponds to a frame-to-frame variance of the macro-block group. While Equation (1) represents one technique for calculating a validation index V, it will be appreciated that other formulae providing a suitable ratio of group size, motion and variance can be used in other embodiments. In general, the larger the validation index V, the more likely the identified group of foreground macro-blocks should be validated as a moving object suitable for tracking from frame to frame. Thus, for example, very small groups and groups that have little frame-to-frame motion are penalized and are less likely to be validated. Groups that have a large frame-to-frame variance are also less likely to be validated. This will tend to eliminate groups of macro-blocks which were distinguished from the background motion model simply on the basis of a small region of motion vector data that does not result in substantial movement from frame to frame (small area A and/or small mean motion $\bar{v}$), and/or that is not consistently associated with a similar object from frame to frame (large variance s). Thus in certain embodiments method 1500 further comprises disregarding groups of foreground macro-blocks having a validation index V that is below a predetermined threshold. See reference numeral 1520 in FIG. 7.

Each of the validated groups of foreground macro-blocks represent a foreground mask corresponding to a moving object. Because this foreground mask is defined by the macro-blocks themselves, it defines only a general location of the moving object. In particular, while most of the moving object will be encompassed within the mask due to the connected nature of the moving object, there may be edge portions of the moving object which fall outside the foreground mask, and which are thus included within macro-blocks associated with the background motion model. Thus in certain embodiments validation and refinement sub-module 156 is optionally configured to refine the foreground mask defined by each group of validated foreground macro-blocks. See reference numeral 1600 in FIG. 3.

Figure 8:
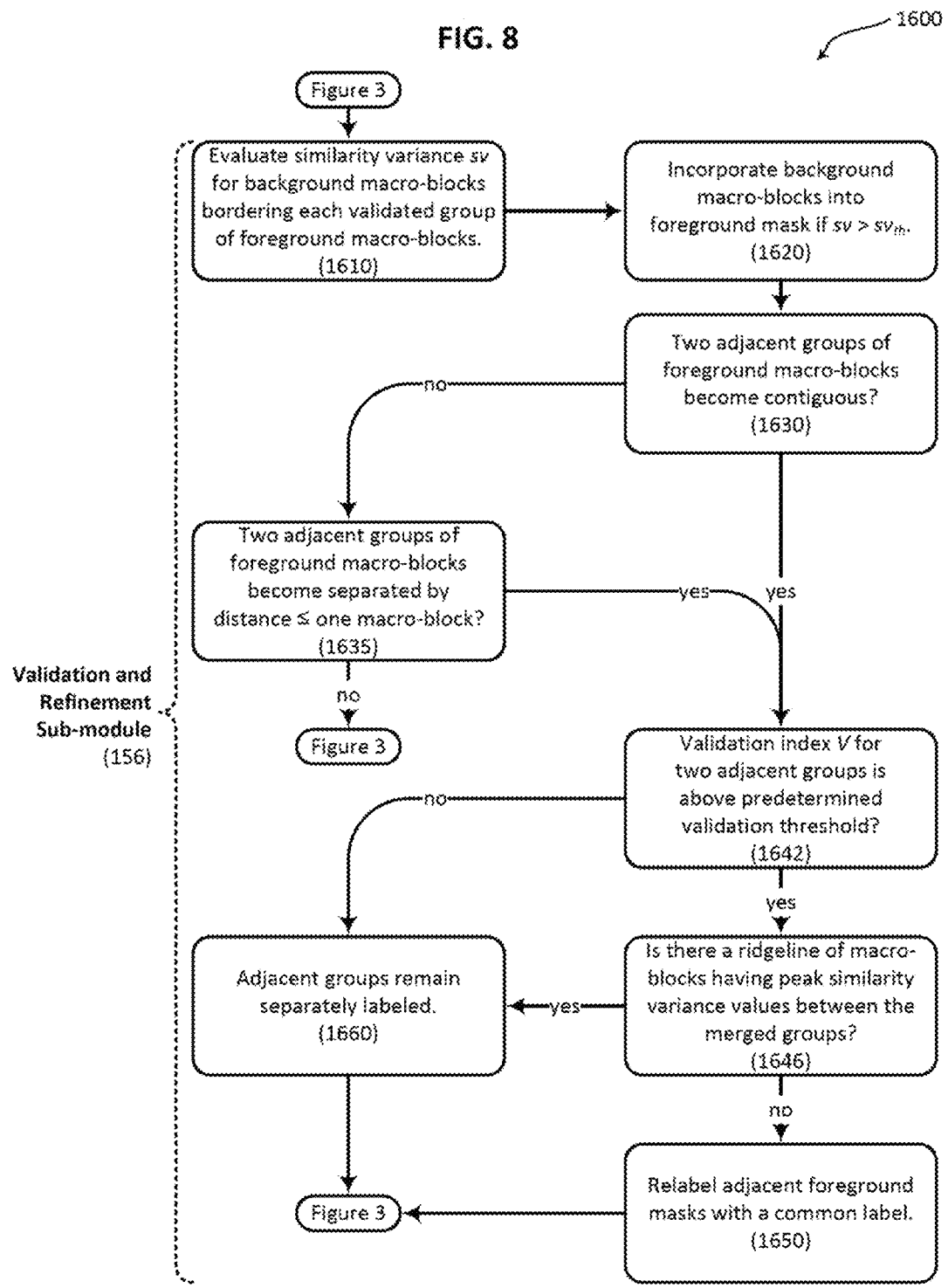
FIG. 8 is a flowchart illustrating an example technique for refining a foreground mask defined by each group of validated foreground macro-blocks in accordance with certain embodiments.

FIG. 8 is a flowchart illustrating an example method 1600 for refining a foreground mask defined by each group of validated foreground macro-blocks in accordance with certain embodiments. In one embodiment method 1600 commences with evaluating a similarity variance sv for background macro-blocks bordering each validated group of foreground macro-blocks. See reference numeral 1610 in FIG. 8. Background macro-blocks having a similarity variance above a threshold $sv_{th}$ may be incorporated into the foreground mask. See reference numeral 1620 in FIG. 8. This is because high variance regions are indicative of the presence of an object edge which should be included within the foreground mask, and which is not part of the background motion model. Thus in one embodiment the process of mask refinement can be understood as adding non-moving high variance edge macro-blocks to the previously identified groups of foreground macro-blocks.

The process of incorporating certain background macro-blocks into the foreground mask may result in two adjacent groups of foreground macro-blocks becoming or almost becoming contiguous. In particular, if two adjacent groups of foreground macro-blocks become contiguous it should be determined whether it would be appropriate to merge the two contiguous groups into a single group of foreground macro-blocks sharing a common label. See reference numeral 1630 in FIG. 8. Likewise, where two adjacent groups of foreground macro-blocks become separated by a distance no greater than one macro-block, it should also be determined whether it would be appropriate to merge the two nearly-contiguous groups into a single group of foreground macro-blocks sharing a common label. See reference numeral 1635 in FIG. 8. In alternative embodiments determinations such as these can be made without regard to whether background macro-blocks were incorporated into the groups of foreground macro-blocks.

In general, merging of two or more groups of contiguous or nearly-contiguous foreground macro-blocks can be considered appropriate where a single object is incorrectly separated into two differently-labeled macro-block groups. On the other hand, merging of two or more groups of contiguous or nearly-contiguous foreground macro-blocks can be considered inappropriate where two distinct objects abut or closely neighbor each other. More specifically, in certain embodiments where two or more adjacent groups of foreground macro-blocks become contiguous or become separated by a distance no greater than one macro-block as a result of mask refinement, merging of such groups can be considered appropriate where two conditions are met. The first of these conditions is that the validation index V, as defined by Equation (1), for any merged group of foreground macro-blocks is above a predetermined validation threshold. See reference numeral 1642 in FIG. 8. This provides an indication that the two regions, if merged, would result in an aggregate region that remains connected with similar appearance and motion when analyzed on a frame-to-frame basis. The second of these conditions is that no ridgeline of macro-blocks having peak similarity variance values exists between the two regions. See reference numeral 1646 in FIG. 8. This provides an indication that no boundary region exists between the two regions. Where these two conditions are met, the adjacent foreground masks can be relabeled with a common label. See reference numeral 1650 in FIG. 8. However, where either of these conditions are not met, the adjacent groups can be left to remain separately labeled. See reference numeral 1660 in FIG. 8.

The object validation and mask refinement methodologies disclosed herein can be understood as producing a binary mask of moving and non-moving regions within each frame of a compressed video stream. Furthermore, where a given frame includes more than one region associated with object movement, each of the moving regions is associated with a unique label. The resolution of this binary mask is limited to the macro-blocks having a dimension of n×n pixels. In many object tracking applications it is unnecessary to extract the exact shape of a moving object. However, if an application should require a more precise extraction of the shape of a moving object, any of a wide variety of existing mask selection algorithms may be used for such applications. Likewise, in alternative embodiments the object masks generated using the techniques disclosed herein can be refined by partially decoding the video stream and performing further analysis on a sub-macro-block level. Other applications may call for a different type of mask to be drawn, such as a bounding box encompassing the tracked object. This can be accomplished by drawing a box having the maximum and minimum horizontal and vertical coordinates associated with a particular group of foreground macro-blocks.

Referring again to FIG. 3, after the moving object masks in a given frame are identified, validated, and refined, the motion of a given object can be tracked from frame to frame. See reference numeral 1700 in FIG. 3. However where consecutive frames include multiple objects, or where moving objects leave or enter a frame, ambiguity can arise with respect to how multiple objects in an initial frame correspond to multiple objects in a subsequent frame. A tracking metric can be used to resolve this ambiguity. For example, in one embodiment a tracking metric T can be defined by $$T = \frac{d_1}{d_0} \times \frac{A_1}{A_0}, \qquad (2)$$

where $d_0$ and $d_1$ correspond to the distance between a reference point and a given group of foreground macro-blocks in initial and subsequent frames, and where $A_0$ and $A_1$ correspond to the area of the given group of foreground macro-blocks in initial and subsequent frames. Thus where a moving object does not change location ($d_0=d_1$) or shape ($A_0=A_1$) between two frames, the tracking metric will equal 1. Likewise, where a moving object undergoes only a slight change in location and/or shape between two frames, the tracking metric will nearly equal 1. Thus, where multiple moving objects exist in initial and subsequent frames, a moving object in an initial frame can be understood as corresponding to the moving object in the subsequent frame having a tracking metric T most closely equaling 1.

When a moving object becomes static the object will no longer be detected as moving in subsequent frames and tracking of the object will cease. Where it is desired to continue tracking an object notwithstanding a pause in the motion of the object, DC coefficient data associated with the object can be correlated between a first I-frame where object movement was detected and a second I-frame where no object movement is detected. See reference numeral 1800 in FIG. 3. Thus where a moving object disappears, the object can be located in a subsequent I-frame by extracting DC coefficient data from the subsequent I-frame in a region where the motion of the object was last detected. If the object remains in the frame as a stationary object, as opposed to having disappeared from the frame, then the object can continue to be tracked on the basis of the correlated DC coefficient data. This advantageously allows an object to continue to be tracked even where its motion pauses.

The foregoing methodologies enable moving objects in an encoded video stream to be tracked based on data directly extracted from the video stream, thereby eliminating any need for the stream to be fully or even partially decoded. In particular, masks for one or more moving objects in a video frame can be generated based solely on extracted motion vector and DC coefficient data. These moving object masks can be validated and refined based on frame-to-frame comparisons of object appearance and motion. Objects can continue to be tracked even when there is a pause in motion by comparing DC coefficient data between a prior I-frame having detected motion and a subsequent I-frame with no detected motion. Once a moving object mask is generated the moving object can be censored, enhanced, or otherwise processed based on the demands of a particular application. Because the analyses disclosed herein can be performed on the basis of extracted motion vector and DC coefficient data, such analysis can be performed significantly faster and with significantly fewer processing resources as compared to analysis techniques that rely on complete or even partial decoding of an encoded video stream. Finally, it will be appreciated that even though the techniques disclosed herein advantageously allow moving objects to be tracked without decoding an encoded video stream, in certain applications these techniques may also be applied during the encoding and/or decoding of a compressed video stream.

Example System

Figure 9:
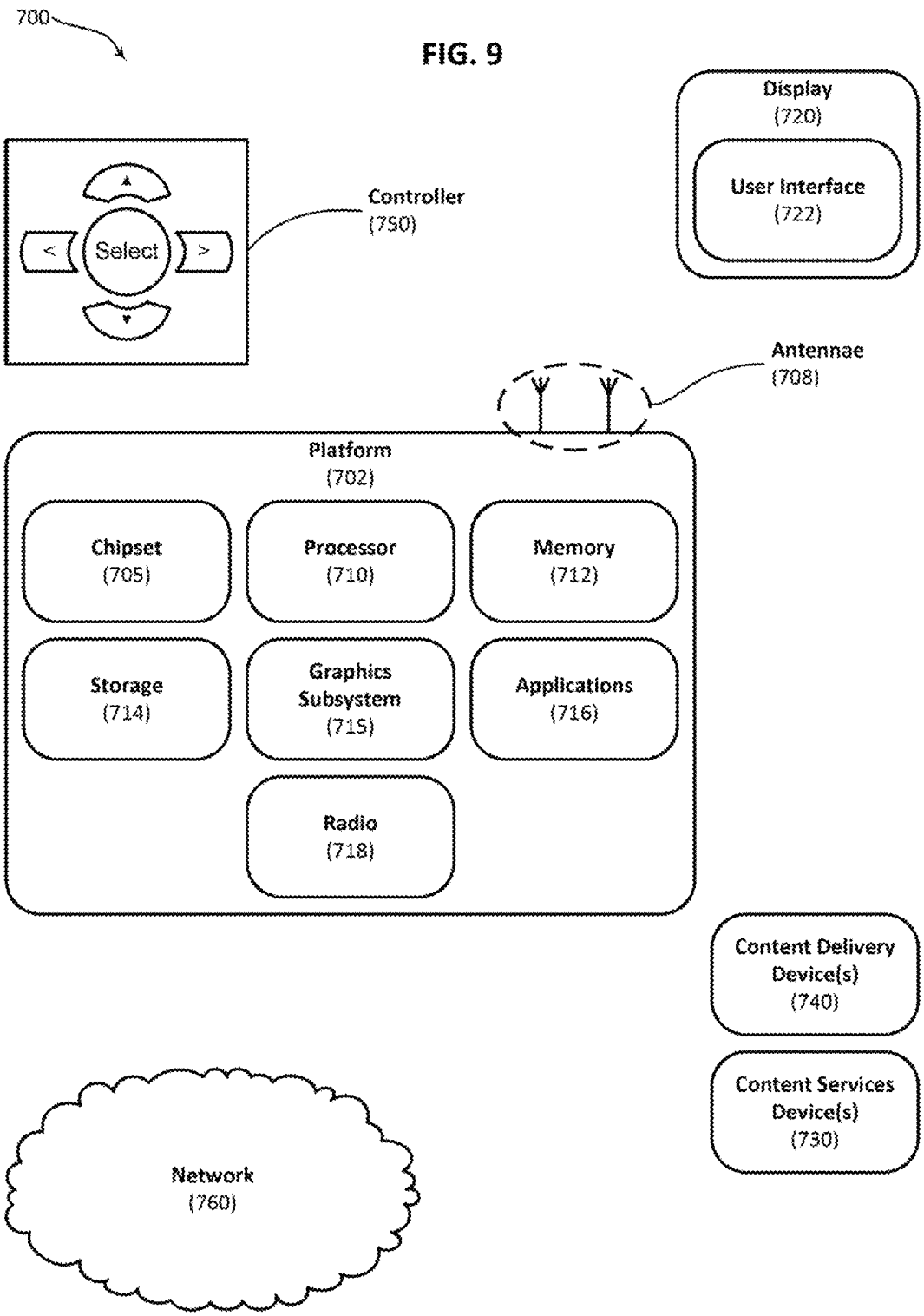
FIG. 9 is a block diagram schematically illustrating a media system configured in accordance with certain of the embodiments disclosed herein.

FIG. 9 illustrates an example system 700 that may carry out object tracking in encoded video streams as described herein. In some embodiments system 700 may be a media system although system 700 is not limited to this context. For example, system 700 may be incorporated into a personal computer, laptop computer, ultra-laptop computer, tablet, touchpad, portable computer, handheld computer, palmtop computer, personal digital assistant (PDA), cellular telephone, combination cellular telephone and PDA, television, smart device (for example, smartphone, smart tablet or smart television), mobile internet device (MID), messaging device, data communication device, and so forth. In embodiments, system 700 comprises a platform 702 coupled to a display 720. Platform 702 may receive content form a content device such as content services device(s) 730 or content delivery device(s) 740 or other similar content sources. A navigation controller 750 comprising one or more navigation features may be used to interact with, for example, platform 702 and/or display 720. Each of these components is described in more detail in turn.

In embodiments, platform 702 may comprise any combination of a chipset 705, a processor 710, a memory 712, a storage 714, a graphics subsystem 715, applications 716, and/or a radio 718. Chipset 705 may provide intercommunication among processor 710, memory 712, storage 714, graphics subsystem 715, applications 716, and/or radio 718. For example, chipset 705 may include a storage adaptor (not illustrated) capable of providing intercommunication with storage 714. Processor 710 may be implemented as complex instruction set computer (CISC) or reduced instruction set computer (RISC) processors, x86 instruction set compatible processors, multicore, or any other microprocessor or central processing unit (CPU). In embodiments, processor 710 may comprise dual core processor(s), dual core mobile processor(s), and so forth. Memory 712 may be implemented as a volatile memory device such as, but not limited to, a RAM, dynamic RAM (DRAM), or static RAM (SRAM) device. Storage 714 may be implemented as a non-volatile storage device such as, but not limited to, a magnetic disk drive, optical disk drive, tape drive, an internal storage device, an attached storage device, flash memory, battery backed-up synchronous DRAM (SDRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit or a visual processing unit (VPU), for example. An analog or digital interface may be used to communicatively couple graphics subsystem 715 and display 720. For example, the interface may be any of a high definition multimedia interface (HDMI), DisplayPort, wireless HDMI, and/or any other suitable interface using wireless high definition compliant techniques. Graphics subsystem 715 could be integrated into processor 710 or chipset 705. Graphics subsystem 715 could be a standalone card communicatively coupled to chipset 705. The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Radio 718 may include one or more radios capable of transmitting and receiving signals using various suitable wireless communication techniques. Such techniques may involve communications across one or more wireless networks. Exemplary wireless networks include, but are not limited to, wireless local area networks, wireless personal area networks, wireless metropolitan area networks, cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touchscreen display, video monitor, television-like device, and/or a television. Display 720 may be digital and/or analog. In embodiments, display 720 may be a holographic display. Also, display 720 may be a transparent or opaque surface that may receive a visual projection. Such projections may convey various forms of information, images, and/or objects. For example, such projections may be a visual overlay for a mobile augmented reality (MAR) application. Under the control of one or more software applications 716, platform 702 may display a user interface 722 on display 720.

In embodiments, content services device(s) 730 may be hosted by any national, international, and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (for example, by sending and/or receiving) media information to and from network 760. Content delivery device(s) 740 also may be coupled to platform 702 and/or to display 720. In embodiments, content services device(s) 730 may comprise a cable television box, personal computer, network, telephone, Internet enabled device or appliance capable of delivering digital information and/or content, and any other similar device capable of unidirectional or bidirectional communication of content between content providers and platform 702 and/or display 720, via network 760 or directly. It will be appreciated that the content may be communicated in a unidirectional and/or bidirectional manner to and from any one of the components in system 700 and a content provider via network 760. Examples of content may include any media information including, for example, video, music, medical and gaming information, and so forth. Content services device(s) 730 receive content such as cable television programming including media information, digital information, and/or other content. Examples of content providers may include any cable or satellite television or radio or Internet content providers. The provided examples are not meant to limit other embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (such as continuous and multidimensional) data into a computer. Many systems such as graphical user interfaces, televisions, and monitors allow the user to control and provide data to the computer or television using physical gestures. Movements of the navigation features of controller 750 may be echoed on a display, such as display 720, by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers, which are not illustrated for clarity, may comprise technology to enable users to instantly turn on and off platform 702 like a television with the touch of a button after initial boot up, when enabled, for example. Program logic may allow platform 702 to stream content to media adaptors or other content services device(s) 730 or content delivery device(s) 740 when the platform is turned "off". In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a Peripheral Component Interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated. In various embodiments, platform 702 and display 720 may be an integrated unit. Display 720 and content services device(s) 730 may be integrated, or display and content delivery device(s) 740 may be integrated, for example. These examples are not meant to limit other embodiments.

In various embodiments, system 700 may be implemented as a wireless system, a wired system, or a combination of both. When implemented as a wireless system, system 700 may include components and interfaces suitable for communicating over a wireless shared media, such as one or more antennae 708, transmitters, receivers, transceivers, amplifiers, filters, control logic, and so forth. An example of wireless shared media may include portions of a wireless spectrum, such as the radiofrequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Platform 702 may establish one or more logical or physical channels to communicate information. The information may include media information and control information. Media information may refer to any data representing content meant for a user. Examples of content may include, for example, data form a voice conversation, videoconference, streaming video, electronic mail ("email") messages, voice mail messages, alphanumeric symbols, graphics, image, video, text, and so forth. Data from a voice conversation may be, for example, speech information, silence periods, background noise, comfort noise, tones, and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
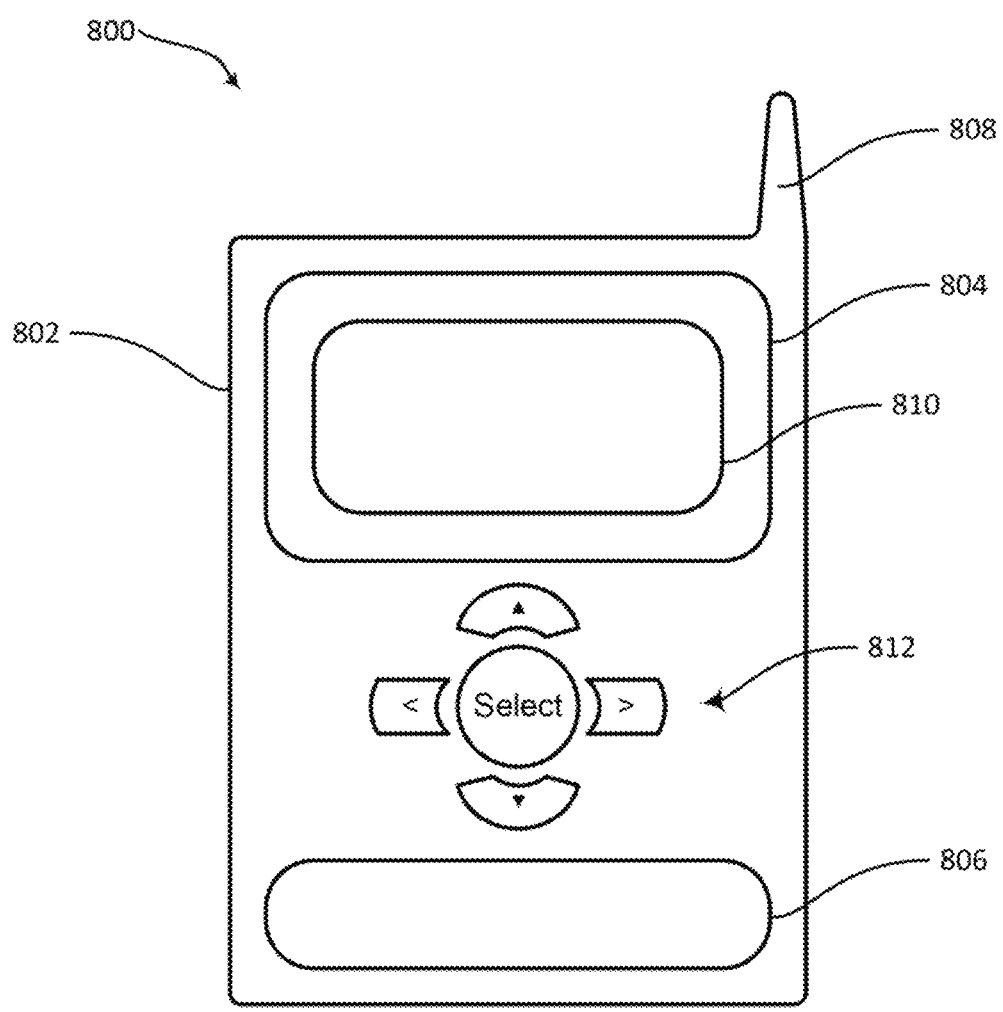
FIG. 10 is a block diagram schematically illustrating a mobile computing system configured in accordance with certain of the embodiments disclosed herein.

As described above, system 700 may be embodied in varying physical styles or form factors. FIG. 10 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example. As described herein, examples of a mobile computing device may include a personal computer, laptop computer, ultra-laptop computer, tablet, touchpad, portable computer, handheld computer, palmtop computer, PDA, cellular telephone, combination cellular telephone and PDA, television, smart device (for example, smartphone, smart tablet or smart television), MID, messaging device, data communication device, and so forth. Examples of a mobile computing device also may include computers that are arranged to be worn by a person such as a wrist computer, finger computer, ring computer, eyeglass computer, belt clip computer, armband computer, shoe computer, clothing computer, and other wearable computers. In embodiments, for example, a mobile computing device may be implemented as a smartphone capable of executing computer applications, as well as voice communications and/or data communications. Although some embodiments may be described with a mobile computer device implemented as smartphone by way of example, it may be appreciated that other embodies may be implemented using other wireless mobile computing devices as well. The embodiments are not limited in this context.

As shown in FIG. 10, device 800 may comprise a housing 802, a display 804, an input/output device 806, and an antenna 808. Device 800 also may comprise navigation features 812. Display 804 may comprise any suitable display unit for displaying information appropriate for a mobile computing device, such as a user interface 810. Input/output device 806 may comprise any suitable input/output device for entering information into a mobile computing device. Examples for input/output device 806 may include an alphanumeric keyboard, a number keypad, a touchpad, input keys, buttons, switches, rocker switches, microphones, speakers, voice recognition devices, software, and so forth. Information also may be entered into device 800 by way of microphone. Such information may be digitized by a voice recognition device or service. The embodiments are not limited in this context.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled", however, may also mean that two or more elements are not in direct contact with each other, but yet still cooperate or interact with each other.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing", "computing", "calculating", "determining", or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for tracking a moving object in a compressed video stream. The method comprises parsing a compressed video stream to extract motion vector data and DC coefficient data for a selected frame of the compressed video stream, the selected frame comprising a plurality of macro-blocks. The method further comprises using the extracted motion vector data to identify a plurality of foreground macro-blocks from amongst the plurality of macro-blocks, the foreground macro-blocks corresponding to motion that is distinguishable from a background motion model. The method further comprises grouping a subset of the plurality of foreground macro-blocks based on a feature map that depends on the extracted motion vector data and DC coefficient data that is associated with the grouped subset of foreground macro-blocks. The method further comprises validating the grouped subset of foreground macro-blocks based on a comparison of a cost metric between the selected frame and a temporally adjacent frame, the cost metric depending on frame-to-frame motion and variance of the grouped subset of foreground macro-blocks.

Example 2 includes the subject matter of Example 1, wherein the frame-to-frame variance of the grouped subset of foreground macro-blocks corresponds to a variance in a similarity measure amongst macro-blocks comprising the grouped subset of foreground macro-blocks; and the similarity measure of a given foreground macro-block depends on one or more of a location of the given foreground macro-block in the selected frame, a gray level variance of the given macro-block as derived from the extracted DC coefficient data, and motion of the given macro-block as derived from the extracted motion vector data.

Example 3 includes the subject matter of Example 1, wherein the compressed video stream comprises a plurality of I-frames containing baseline data and a plurality of P-frames containing incremental change data; and the compressed video stream is parsed without applying incremental data contained in a given P-frame to baseline data contained in a corresponding I-frame.

Example 4 includes the subject matter of Example 1 or Example 3, wherein using the extracted motion vector data to identify the plurality of foreground macro-blocks further comprises counting motion vectors and defining the background motion model based on a most numerous motion vector categorization in a given dimension.

Example 5 includes the subject matter of Example 1, further comprising assigning a primary unique foreground label to a selected one of the plurality of foreground macro-blocks, wherein the selected foreground macro-block has a minimum similarity variance for a particular contiguous cluster of foreground macro-blocks.

Example 6 includes the subject matter of Example 1 or Example 5, further comprising assigning a secondary unique foreground label to a selected one of the plurality of foreground macro-blocks wherein the selected foreground macro-block is surrounded by macro-blocks associated with the background motion model.

Example 7 includes the subject matter of Example 1 of Example 5, further comprising assigning a secondary unique foreground label to a selected one of the plurality of foreground macro-blocks, wherein the selected foreground macro-block corresponding to the secondary unique foreground label (a) is surrounded by other foreground macro-blocks and (b) is associated with a peak similarity variance value.

Example 8 includes the subject matter of Example 7, wherein a similarity variance of a given foreground macro-block corresponds to a variance in a similarity measure amongst the given foreground macro-block and foreground macro-blocks which are contiguous to the given foreground macro-block.

Example 9 includes the subject matter of Example 1, further comprising assigning a primary unique foreground label to a selected one of the plurality of foreground macro-blocks, wherein (a) the selected foreground macro-block has a minimum similarity variance for a particular contiguous cluster of foreground macro-blocks; and (b) a similarity variance of a given foreground macro-block corresponds to a variance in a similarity measure amongst the given foreground macro-block and foreground macro-blocks which are contiguous to the given foreground macro-block.

Example 10 includes the subject matter of Example 1, further comprising assigning a primary unique foreground label to a selected one of the plurality of foreground macro-blocks, wherein (a) the selected foreground macro-block has a minimum similarity variance for a particular contiguous cluster of foreground macro-blocks; (b) a similarity variance of a given foreground macro-block corresponds to a variance in a similarity measure amongst the given foreground macro-block and foreground macro-blocks which are contiguous to the given foreground macro-block; and (c) the similarity measure of the given foreground macro-block depends on one or more of a location of the given macro-block in the selected frame, a gray level variance of the given macro-block as derived from the extracted DC coefficient data, and motion of the given macro-block as derived from the extracted motion vector data.

Example 11 includes the subject matter of Example 1, further comprising assigning a secondary unique foreground label to a selected one of the plurality of foreground macro-blocks, wherein (a) the selected foreground macro-block (i) is surrounded by other foreground macro-blocks and (ii) is associated with a peak similarity variance value; (b) a similarity variance of a given foreground macro-block corresponds to a variance in a similarity measure amongst the given foreground macro-block and foreground macro-blocks which are contiguous to the given foreground macro-block; and (c) the similarity measure of the given foreground macro-block depends on one or more of a location of the given macro-block in the selected frame, a gray level variance of the given macro-block as derived from the extracted DC coefficient data, and motion of the given macro-block as derived from the extracted motion vector data.

Example 12 includes the subject matter of Example 9, Example 10, or Example 11, wherein the similarity variance of a given foreground macro-block corresponds to a variance in a similarity measure amongst the given foreground macro-block and foreground macro-blocks which are horizontally, vertically, and diagonally contiguous to the given foreground macro-block.

Example 13 includes the subject matter of Example 1, wherein the feature map of a given macro-block depends on a location of the given macro-block within the selected frame, motion vector data associated with the given macro-block, and a similarity variance of the given macro-block.

Example 14 includes the subject matter of Example 1, wherein grouping the subset of foreground macro-blocks further comprises assigning a given foreground macro-block a label that is equivalent to a label of a neighboring foreground macro-block; and the neighboring foreground macro-block and the given foreground macro-block have a feature map differential that is smaller than a feature map differential for other foreground macro-blocks neighboring the given foreground macro-block.

Example 15 includes the subject matter of Example 1, wherein the cost metric further depends on an area of the grouped subset of foreground macro-blocks.

Example 16 includes the subject matter of Example 1, further comprising adding a macro-block associated with the background motion model to the grouped subset of foreground macro-blocks, wherein the added background macro-block has a similarity variance that exceeds a predetermined threshold.

Example 17 includes the subject matter of Example 1, further comprising adding a macro-block associated with the background motion model to the grouped subset of foreground macro-blocks, wherein the added background macro-block has a similarity variance that exceeds a predetermined threshold; and merging two or more adjacent grouped subsets of foreground macro-blocks where (a) the two or more adjacent grouped subsets are separated by a distance of no more than one macro-block and (b) a respective cost metric for each of the two or more adjacent grouped subsets is above a predetermined threshold.

Example 18 is a system for tracking a moving object in a compressed video stream, the system comprising a bit stream parser configured to extract motion vector data and DC coefficient data from an encoded video stream without decoding the encoded video stream, wherein a given frame of the encoded video stream comprises a plurality of macro-blocks. The system further comprises an object detection sub-module configured to distinguish a plurality of foreground macro-blocks that correspond to a moving object from a background motion model. The system further comprises a macro-block grouping sub-module configured to group a subset of the plurality of foreground macro-blocks based on the extracted motion vector data and DC coefficient data. The system further comprises an object validation sub-module configured to validate the grouped subset of foreground macro-blocks based on a comparison of a cost metric between the given frame and a temporally adjacent frame, the cost metric depending on frame-to-frame motion and variance of the grouped subset of foreground macro-blocks.

Example 19 includes the subject matter of Example 18, wherein the cost metric further depends on an area of the grouped subset of foreground macro-blocks.

Example 20 includes the subject matter of Example 18, further comprising an object refinement sub-module configured to assign a given foreground macro-block a label that is equivalent to a label of a neighboring foreground macro-block, wherein (a) the neighboring foreground macro-block has a feature map differential with respect to the given foreground macro-block that is smaller than a feature map differential for other neighboring foreground macro-blocks with respect to the given foreground macro-block; and (b) the feature map differentials are based on feature maps of respective foreground macro-blocks that depend on the extracted motion vector data and DC coefficient data that is associated with respective macro-blocks.

Example 21 includes the subject matter of Example 18 or Example 20, wherein the object detection sub-module is further configured to count motion vectors and define the background motion model based on a most numerous motion vector categorization in a given dimension.

Example 22 includes the subject matter of Example 18, further comprising a macro-block labeling sub-module configured to assign a primary unique foreground label to a selected one of the plurality of foreground macro-blocks, wherein the selected foreground macro-block has a minimum similarity variance for a particular continuous cluster of foreground macro-blocks.

Example 23 includes the subject matter of Example 18, further comprising a macro-block labeling sub-module configured to (a) assign a primary unique foreground label to a selected one of the plurality of foreground macro-blocks, wherein the selected foreground macro-block has a minimum similarity variance for a particular continuous cluster of foreground macro-blocks; and (b) assign a secondary unique foreground label to a selected one of the plurality of foreground macro-blocks wherein the selected foreground macro-block corresponding to the secondary unique foreground label is surrounded by macro-blocks associated with the background motion model.

Example 24 includes the subject matter of Example 18, further comprising a macro-block labeling sub-module configured to (a) assign a primary unique foreground label to a selected one of the plurality of foreground macro-blocks, wherein the selected foreground macro-block has a minimum similarity variance for a particular continuous cluster of foreground macro-blocks; and (b) assign a secondary unique foreground label to a selected one of the plurality of foreground macro-blocks, wherein the selected foreground macro-block corresponding to the secondary unique foreground label (a) is surrounded by other foreground macro-blocks and (b) is associated with a peak similarity variance value.

Example 25 includes the subject matter of Example 22, Example 22, or Example 24, wherein a similarity variance of a given foreground macro-block corresponds to a variance in a similarity measure amongst the given foreground macro-block and foreground macro-blocks which are contiguous to the given foreground macro-block.

Example 26, includes the subject matter of Example 25, wherein the similarity measure of the given foreground macro-block depends on one or more of a location of the given macro-block in the given frame, a gray level variance of the given macro-block as derived from the extracted DC coefficient data, and motion of the given macro-block as derived from the extracted motion vector data.

Example 27 includes the subject matter of Example 25, wherein the similarity variance of a given foreground macro-block corresponds to a variance in a similarity measure amongst the given foreground macro-block and foreground macro-blocks which are horizontally, vertically, and diagonally contiguous to the given foreground macro-block.

Example 28 is a non-transitory computer readable medium having instructions encoded thereon that, when executed by one or more processors, cause an object tracking process for an encoded video stream to be carried out. The process comprises parsing a compressed video stream to extract motion vector data and DC coefficient data for a selected frame of the compressed video stream, the selected frame comprising a plurality of macro-blocks. The process further comprises using the extracted motion vector data to identify a plurality of foreground macro-blocks that correspond to motion that is distinguishable from a background motion model. The process further comprises grouping a subset of the plurality foreground macro-blocks based on a feature map that depends on the extracted motion vector data and DC coefficient data that is associated with the grouped subset of foreground macro-blocks, wherein the grouped subset of foreground macro-blocks corresponds to one of a plurality of moving objects in the selected frame. The process further comprises defining an object mask based on the grouped subset of foreground macro-blocks, the object mask encompassing one of the moving objects in the selected frame.

Example 29 includes the subject matter of Example 28, wherein the feature map of a given macro-block depends on a location of the given macro-block within the selected frame, motion vector data associated with the given macro-block, and a similarity variance of the given macro-block.

Example 30 includes the subject matter of Example 28, further comprising assigning a primary unique foreground label to a selected one of the plurality of foreground macro-blocks, wherein (a) the selected foreground macro-block has a minimum similarity variance for a particular contiguous cluster of foreground macro-blocks; and (b) a similarity variance of a given foreground macro-block corresponds to a variance in a similarity measure amongst the given foreground macro-block and foreground macro-blocks which are contiguous to the given foreground macro-block.

Example 31 includes the subject matter of Example 28, further comprising assigning a primary unique foreground label to a selected one of the plurality of foreground macro-blocks, wherein (a) the selected foreground macro-block has a minimum similarity variance for a particular contiguous cluster of foreground macro-blocks; (b) a similarity variance of a given foreground macro-block corresponds to a variance in a similarity measure amongst the given foreground macro-block and foreground macro-blocks which are contiguous to the given foreground macro-block; and (c) the similarity measure of the given foreground macro-block depends on one or more of a location of the given macro-block in the selected frame, a gray level variance of the given macro-block as derived from the extracted DC coefficient data, and motion of the given macro-block as derived from the extracted motion vector data.

Example 32 includes the subject matter of Example 28, further comprising assigning a primary unique foreground label to a selected one of the plurality of foreground macro-blocks, wherein the selected foreground macro-block has a minimum similarity variance for a particular contiguous cluster of foreground macro-blocks.

Example 33 includes the subject matter of Example 30, Example 31, or Example 32, wherein the similarity variance of a given foreground macro-block corresponds to a variance in a similarity measure amongst the given foreground macro-block and foreground macro-blocks which are horizontally, vertically, and diagonally contiguous to the given foreground macro-block.

Example 34 includes the subject matter of Example 30, Example 31, or Example 32, further comprising assigning a secondary unique foreground label to a selected one of the plurality of foreground macro-blocks wherein the selected foreground macro-block is surrounded by macro-blocks associated with the background motion model.

Example 35 includes the subject matter of Example 30, Example 31, or Example 32, further comprising assigning a secondary unique foreground label to a selected one of the plurality of foreground macro-blocks, wherein the selected foreground macro-block corresponding to the secondary unique foreground label (a) is surrounded by other foreground macro-blocks and (b) is associated with a peak similarity variance value.

Example 36 includes the subject matter of Example 32, wherein a similarity variance of a given foreground macro-block corresponds to a variance in a similarity measure amongst the given foreground macro-block and foreground macro-blocks which are contiguous to the given foreground macro-block.

Example 37 includes the subject matter of Example 28, wherein the process further comprises validating the grouped subset of foreground macro-blocks based on a comparison of a cost metric between the selected frame and a temporally adjacent frame, the cost metric depending on frame-to-frame motion and variance of the grouped subset of foreground macro-blocks.

Example 38 includes the subject matter of Example 28, wherein the compressed video stream comprises a plurality of I-frames containing baseline data and a plurality of P-frames containing incremental change data; and the compressed video stream is parsed without applying incremental data contained in a given P-frame to baseline data contained in a corresponding I-frame.

Example 39 includes the subject matter of Example 28, wherein using the extracted motion vector data to identify the plurality of foreground macro-blocks further comprises counting motion vectors and defining the background motion model based on a most numerous motion vector categorization in a given dimension.

The foregoing description of example embodiments is presented for the purposes of illustration and description. It is not intended to be exhaustive or to limit this disclosure to the precise forms described. Many modifications and variations are possible in light of this disclosure. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for tracking a moving object in a compressed video stream, the method comprising:
   receiving, by a computer system having a processor coupled to a memory device, a compressed video stream that comprises a plurality of frames, each frame including motion vector data and DC coefficient data;
   using a bit stream parser stored in the memory device to parse the compressed video stream, thereby extracting motion vector data and DC coefficient data for a selected frame of the compressed video stream, the selected frame comprising a plurality of macro-blocks;
   using an object detection sub-module stored in the memory device and the extracted motion vector data to identify a plurality of foreground macro-blocks from amongst the plurality of macro-blocks, the foreground macro-blocks corresponding to motion that is distinguishable from a background motion model;
   using a grouping and labeling sub-module stored in the memory device to group a subset of the plurality of foreground macro-blocks based on a feature map that depends on the extracted motion vector data and DC coefficient data that is associated with the grouped subset of foreground macro-blocks; and
   using a validation and refinement sub-module stored in the memory device to validate the grouped subset of foreground macro-blocks based on a comparison of a cost metric between the selected frame and a temporally adjacent frame, the cost metric depending on frame-to-frame motion and variance of the grouped subset of foreground macro-blocks.

2. The method of claim 1, wherein:
   the frame-to-frame variance of the grouped subset of foreground macro-blocks corresponds to a variance in a similarity measure amongst macro-blocks comprising the grouped subset of foreground macro-blocks; and
   the similarity measure of a given foreground macro-block depends on one or more of a location of the given foreground macro-block in the selected frame, a gray level variance of the given macro-block as derived from the extracted DC coefficient data, and motion of the given macro-block as derived from the extracted motion vector data.

3. The method of claim 1, wherein:
   the compressed video stream comprises a plurality of I-frames containing baseline data and a plurality of P-frames containing incremental change data; and
   the compressed video stream is parsed without applying incremental data contained in a given P-frame to baseline data contained in a corresponding I-frame.

4. The method of claim 1, further comprising using the grouping and labeling sub-module to assign a primary unique foreground label to a selected one of the plurality of foreground macro-blocks, wherein the selected foreground macro-block has a minimum similarity variance for a particular contiguous cluster of foreground macro-blocks.

5. The method of claim 1, further comprising using the grouping and labeling sub-module to assign a secondary unique foreground label to a selected one of the plurality of foreground macro-blocks wherein the selected foreground macro-block is surrounded by macro-blocks associated with the background motion model.

6. The method of claim 1, further comprising using the grouping and labeling sub-module to assign a primary unique foreground label to a selected one of the plurality of foreground macro-blocks, wherein:
   the selected foreground macro-block has a minimum similarity variance for a particular contiguous cluster of foreground macro-blocks; and
   a similarity variance of a given foreground macro-block corresponds to a variance in a similarity measure amongst the given foreground macro-block and foreground macro-blocks which are contiguous to the given foreground macro-block.

7. The method of claim 1, further comprising using the grouping and labeling sub-module to assign a secondary unique foreground label to a selected one of the plurality of foreground macro-blocks, wherein:
   the selected foreground macro-block (a) is surrounded by other foreground macro-blocks and (b) is associated with a peak similarity variance value;
   a similarity variance of a given foreground macro-block corresponds to a variance in a similarity measure amongst the given foreground macro-block and foreground macro-blocks which are contiguous to the given foreground macro-block; and
   the similarity measure of the given foreground macro-block depends on one or more of a location of the given foreground macro-block in the selected frame, a gray level variance of the given foreground macro-block as derived from the extracted DC coefficient data, and motion of the given foreground macro-block as derived from the extracted motion vector data.

8. The method of claim 1, wherein the feature map of a given macro-block depends on a location of the given macro-block within the selected frame, motion vector data associated with the given macro-block, and a similarity variance of the given macro-block.

9. The method of claim 1, wherein:
   grouping the subset of foreground macro-blocks further comprises assigning a given foreground macro-block a label that is equivalent to a label of a neighboring foreground macro-block; and
   the neighboring foreground macro-block and the given foreground macro-block have a feature map differential that is smaller than a feature map differential for other foreground macro-blocks neighboring the given foreground macro-block.

10. The method of claim 1, further comprising using the grouping and labeling sub-module to add a macro-block associated with the background motion model to the grouped subset of foreground macro-blocks, wherein the added background macro-block has a similarity variance that exceeds a predetermined threshold.

11. The method of claim 1, further comprising:
   using the grouping and labeling sub-module to add a macro-block associated with the background motion model to the grouped subset of foreground macro-blocks, wherein the added background macro-block has a similarity variance that exceeds a predetermined threshold; and
   using the validation and refinement sub-module to merge two or more adjacent grouped subsets of foreground macro-blocks where (a) the two or more adjacent grouped subsets are separated by a distance of no more than one macro-block and (b) a respective cost metric for each of the two or more adjacent grouped subsets is above a predetermined validation index threshold.

12. A system for tracking a moving object in an encoded video stream, the system comprising a memory device and a processor that is operatively coupled to the memory device, wherein the processor is configured to execute instructions stored in the memory device that, when executed, cause the processor to carry out an object tracking process that comprises:
- receiving an encoded video stream that comprises a plurality of frames, each frame including motion vector data and DC coefficient data;
- using a bit stream parser to extract motion vector data and DC coefficient data from the encoded video stream without decoding the encoded video stream, wherein a given frame of the encoded video stream comprises a plurality of macro-blocks;
- using an object detection sub-module to distinguish a plurality of foreground macro-blocks that correspond to a moving object from a background motion model;
- using a macro-block grouping sub-module to group a subset of the plurality of foreground macro-blocks based on the extracted motion vector data and DC coefficient data; and
- using an object validation sub-module to validate the grouped subset of foreground macro-blocks based on a comparison of a cost metric between the given frame and a temporally adjacent frame, the cost metric depending on frame-to-frame motion and variance of the grouped subset of foreground macro-blocks.

13. The system of claim 12, wherein the cost metric further depends on an area of the grouped subset of foreground macro-blocks.

14. The system of claim 12, wherein:
- the object tracking process further using an object refinement sub-module to assign a given foreground macro-block a label that is equivalent to a label of a neighboring foreground macro-block;
- the neighboring foreground macro-block has a feature map differential with respect to the given foreground macro-block that is smaller than a feature map differential for other neighboring foreground macro-blocks with respect to the given foreground macro-block; and
- the feature map differentials are based on feature maps of respective foreground macro-blocks that depend on the extracted motion vector data and DC coefficient data that is associated with respective macro-blocks.

15. The system of claim 12, wherein:
- the object tracking process further using a macro-block labeling sub-module to assign a primary unique foreground label to a selected one of the plurality of foreground macro-blocks; and
- the selected foreground macro-block has a minimum similarity variance amongst a particular continuous cluster of foreground macro-blocks.

16. The system of claim 12, wherein the object tracking process further comprises using a macro-block labeling sub-module to:
- assign a primary unique foreground label to a first selected one of the plurality of foreground macro-blocks, wherein the first selected foreground macro-block has a minimum similarity variance amongst a particular continuous cluster of foreground macro-blocks; and
- assign a secondary unique foreground label to a second selected one of the plurality of foreground macro-blocks wherein the second selected foreground macro-block corresponding to the secondary unique foreground label is surrounded by macro-blocks associated with the background motion model.

17. The system of claim 12, wherein the object tracking process further comprises using a macro-block labeling sub-module to:
- assign a primary unique foreground label to a first selected one of the plurality of foreground macro-blocks, wherein the first selected foreground macro-block has a minimum similarity variance amongst a particular continuous cluster of foreground macro-blocks; and
- assign a secondary unique foreground label to a second selected one of the plurality of foreground macro-blocks, wherein the second selected foreground macro-block corresponding to the secondary unique foreground label (a) is surrounded by other foreground macro-blocks and (b) is associated with a peak similarity variance value.

18. A non-transitory computer readable medium having instructions encoded thereon that, when executed by one or more processors, cause an object tracking process for a compressed video stream to be carried out, the process comprising:
- receiving a compressed video stream that comprises a plurality of frames, each frame including motion vector data and DC coefficient data;
- parsing the compressed video stream, thereby extracting motion vector data and DC coefficient data for a selected frame of the compressed video stream, the selected frame comprising a plurality of macro-blocks;
- using the extracted motion vector data to identify a plurality of foreground macro-blocks that correspond to motion that is distinguishable from a background motion model;
- grouping a subset of the plurality foreground macro-blocks based on a feature map that depends on the extracted motion vector data and DC coefficient data that is associated with the grouped subset of foreground macro-blocks, wherein the grouped subset of foreground macro-blocks corresponds to a moving object in the selected frame; and
- defining an object mask based on the grouped subset of foreground macro-blocks, the object mask encompassing the moving object in the selected frame.

19. The non-transitory computer readable medium of claim 18, wherein the feature map of a given macro-block depends on a location of the given macro-block within the selected frame, motion vector data associated with the given macro-block, and a similarity variance of the given macro-block.

20. The non-transitory computer readable medium of claim 18, the object tracking process further comprising assigning a primary unique foreground label to a selected one of the plurality of foreground macro-blocks, wherein:
- the selected foreground macro-block has a minimum similarity variance for a particular contiguous cluster of foreground macro-blocks; and
- a similarity variance of a given foreground macro-block corresponds to a variance in a similarity measure amongst the given foreground macro-block and foreground macro-blocks which are contiguous to the given foreground macro-block.

21. The non-transitory computer readable medium of claim 18, the object tracking process further comprising assigning a primary unique foreground label to a selected one of the plurality of foreground macro-blocks, wherein:
- the selected foreground macro-block has a minimum similarity variance for a particular contiguous cluster of foreground macro-blocks;
- a similarity variance of a given foreground macro-block corresponds to a variance in a similarity measure amongst the given foreground macro-block and foreground macro-blocks which are contiguous to the given foreground macro-block; and the similarity measure of the given foreground macro-block depends on one or more of a location of the given foreground macro-block in the selected frame, a gray level variance of the given foreground macro-block as derived from the extracted DC coefficient data, and motion of the given foreground macro-block as derived from the extracted motion vector data.

22. The non-transitory computer readable medium of claim 18, the object tracking process further comprising assigning a primary unique foreground label to a selected one of the plurality of foreground macro-blocks, wherein the selected foreground macro-block has a minimum similarity variance for a particular contiguous cluster of foreground macro-blocks.

23. The non-transitory computer readable medium of claim 18, wherein the object tracking process further comprises validating the grouped subset of foreground macro-blocks based on a comparison of a cost metric between the selected frame and a temporally adjacent frame, the cost metric depending on frame-to-frame motion and variance of the grouped subset of foreground macro-blocks.

24. The non-transitory computer readable medium of claim 18, wherein:

the compressed video stream comprises a plurality of I-frames containing baseline data and a plurality of P-frames containing incremental change data; and the compressed video stream is parsed without applying incremental data contained in a given P-frame to baseline data contained in a corresponding I-frame.

25. The non-transitory computer readable medium of claim 18, wherein using the extracted motion vector data to identify the plurality of foreground macro-blocks further comprises counting motion vectors and defining the background motion model based on a most numerous motion vector categorization in a given dimension.

* * * * *

UNITED STATES PATENT AND TRADEMARK OFFICE
CERTIFICATE OF CORRECTION

PATENT NO. : 9,589,363 B2
APPLICATION NO. : 14/224611
DATED : March 7, 2017
INVENTOR(S) : Sean J. Lawrence et al.

Page 1 of 1

It is certified that error appears in the above-identified patent and that said Letters Patent is hereby corrected as shown below:

In the Claims

Column 29, Line 29, Claim 14, please replace "further using" with --further comprises using--.
Column 29, Line 43, Claim 15, please replace "further using" with --further comprises using--.

Signed and Sealed this
Twenty-third Day of May, 2017

Michelle K. Lee
*Director of the United States Patent and Trademark Office*